US011495220B2

(12) United States Patent
Lee et al.

(10) Patent No.: US 11,495,220 B2
(45) Date of Patent: Nov. 8, 2022

(54) ELECTRONIC DEVICE AND METHOD OF CONTROLLING THEREOF

(71) Applicant: SAMSUNG ELECTRONICS CO., LTD., Suwon-si (KR)

(72) Inventors: Donghyeon Lee, Suwon-si (KR); Seonghan Ryu, Suwon-si (KR); Yubin Seo, Suwon-si (KR); Eunji Lee, Suwon-si (KR); Sungja Choi, Suwon-si (KR); Jiyeon Hong, Suwon-si (KR); Sechun Kang, Suwon-si (KR); Yongjin Cho, Suwon-si (KR); Seungchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/683,571

(22) Filed: Nov. 14, 2019

(65) Prior Publication Data
US 2020/0175985 A1 Jun. 4, 2020

(30) Foreign Application Priority Data

Dec. 3, 2018 (KR) .................. 10-2018-0153683

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G06F 40/30* (2020.01); *G10L 13/00* (2013.01);
(Continued)

(58) Field of Classification Search
CPC ....... G06F 40/253; G06F 40/35; H04L 51/02; H04L 51/04; H04M 3/5335
See application file for complete search history.

(56) References Cited

U.S. PATENT DOCUMENTS 9,225,831 B2  12/2015  Kim et al.
9,721,004 B2  8/2017  Byron et al.
(Continued)

FOREIGN PATENT DOCUMENTS

EP  2747389 A2  6/2014
KR  10-2013-0143680  12/2013
(Continued)

OTHER PUBLICATIONS

Search Report and Written Opinion dated Mar. 9, 2020 in counterpart International Application No. PCT/KR2019/015777.
(Continued)

*Primary Examiner* — Daniel Abebe
(74) *Attorney, Agent, or Firm* — Nixon & Vanderhye P.C.

(57) ABSTRACT

Disclosed is an electronic device. The electronic device may execute an application for transmitting and receiving at least one of text data or voice data with another electronic device using the communication module, in response to occurrence of at least one event, based on receiving at least one of text data or voice data from the another electronic device, identify that a confirmation is necessary using the digital assistant based on at least one of text data or voice data being generated based on a characteristic of ab utterance using a digital assistant, generate a notification to request confirmation using the digital assistant based on confirmation being necessary, and output the notification using the application. A method for identifying that a confirmation is necessary may include identifying using voice data or text data that is received from another electronic device using a rule-based or AI algorithm.

(Continued)

When a confirmation is necessary is identified using the AI algorithm, the method may use machine learning, neural network, or a deep learning algorithm.

19 Claims, 17 Drawing Sheets

(51) Int. Cl.
  *G06F 40/30* (2020.01)
  *G06F 3/16* (2006.01)
  *G10L 15/30* (2013.01)
  *G10L 13/00* (2006.01)
(52) U.S. Cl.
  CPC ........ *G10L 15/30* (2013.01); *G10L 2015/223* (2013.01)

(56) References Cited

U.S. PATENT DOCUMENTS

| | | | |
|---|---|---|---|
| 10,764,534 B1* | 9/2020 | Shevchenko | G06F 40/253 |
| 2010/0198931 A1* | 8/2010 | Pocklington | G06Q 10/107 |
| | | | 709/224 |
| 2014/0029734 A1* | 1/2014 | Kim | H04M 3/4936 |
| | | | 379/88.01 |
| 2015/0278196 A1* | 10/2015 | Dua | G06F 40/30 |
| | | | 704/9 |
| 2016/0285790 A1 | 9/2016 | Szeto et al. | |
| 2016/0352895 A1 | 12/2016 | Son et al. | |
| 2017/0132019 A1 | 5/2017 | Karashchuk et al. | |
| 2017/0171121 A1 | 6/2017 | Zhang et al. | |
| 2017/0257329 A1* | 9/2017 | Tetreault | G06F 40/253 |
| 2017/0286027 A1 | 10/2017 | Chang et al. | |
| 2018/0129651 A1* | 5/2018 | Latvala | G06F 40/56 |
| 2018/0248819 A1* | 8/2018 | Shionozaki | G06F 3/0482 |
| 2018/0332118 A1 | 11/2018 | Phipps et al. | |
| 2019/0081914 A1* | 3/2019 | Chang | H04L 51/02 |
| 2019/0114569 A1* | 4/2019 | Palmer, II | G06F 40/35 |

FOREIGN PATENT DOCUMENTS

| | | |
|---|---|---|
| KR | 10-2014-0125486 | 10/2014 |
| WO | 01/75555 A2 | 10/2001 |
| WO | 2015/047932 A1 | 4/2015 |
| WO | 2015/156443 A1 | 10/2015 |
| WO | 2016/003509 A1 | 1/2016 |

OTHER PUBLICATIONS

Extended European Search Report dated Apr. 22, 2020 in counterpart European Patent Application No. 19210852.0.
European Examination Report dated Nov. 17, 2021 for EP Application No. 19210852.0.
India Examination Report dated Mar. 2, 2022 for IN Application No. 202127025460.

* cited by examiner

FIG. 4
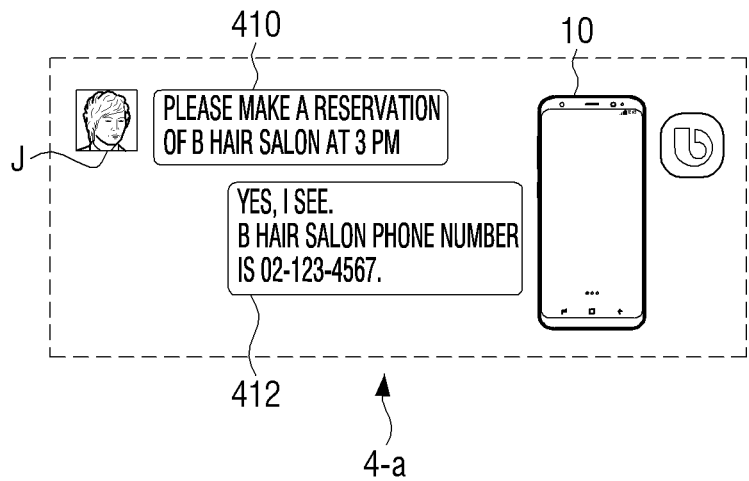
4-a
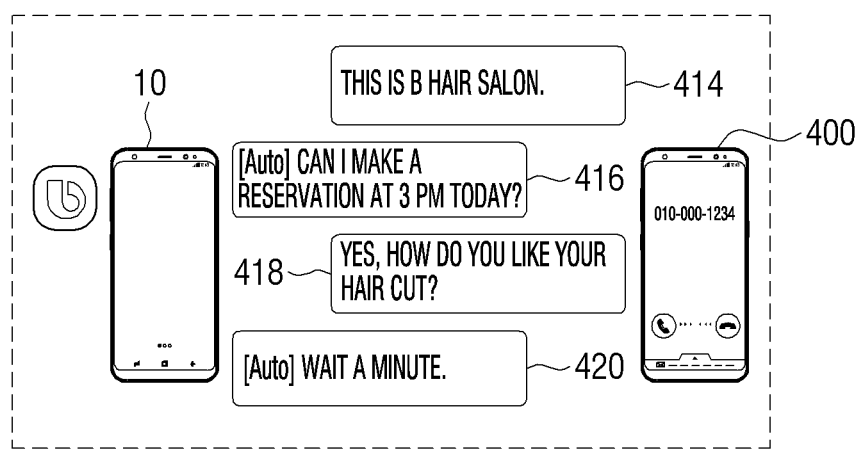
4-b
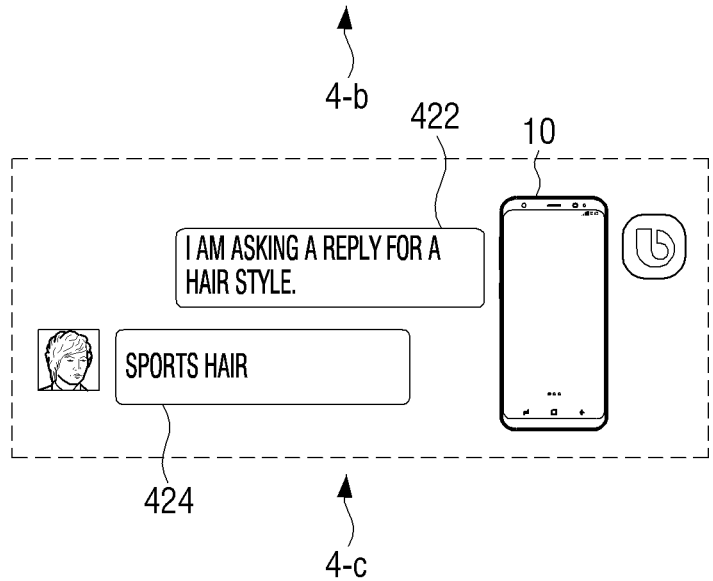
4-c

FIG. 8
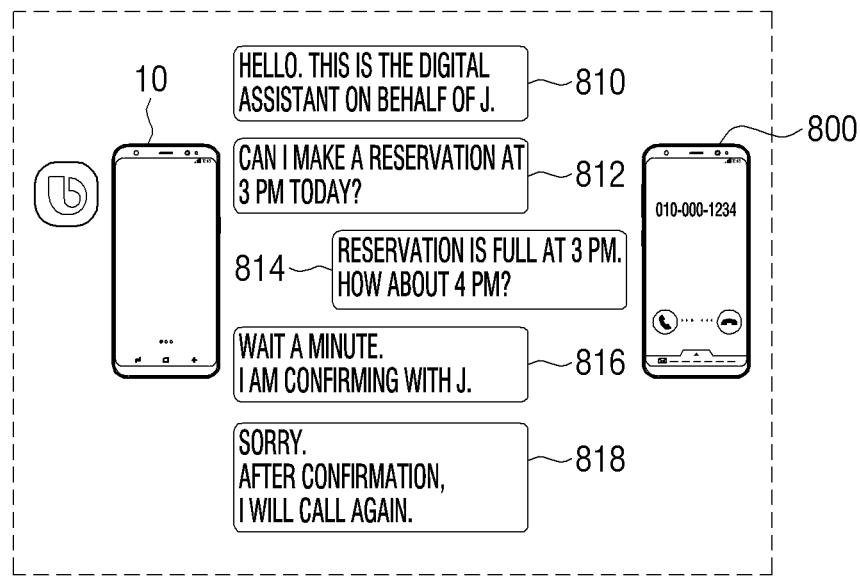
8-a
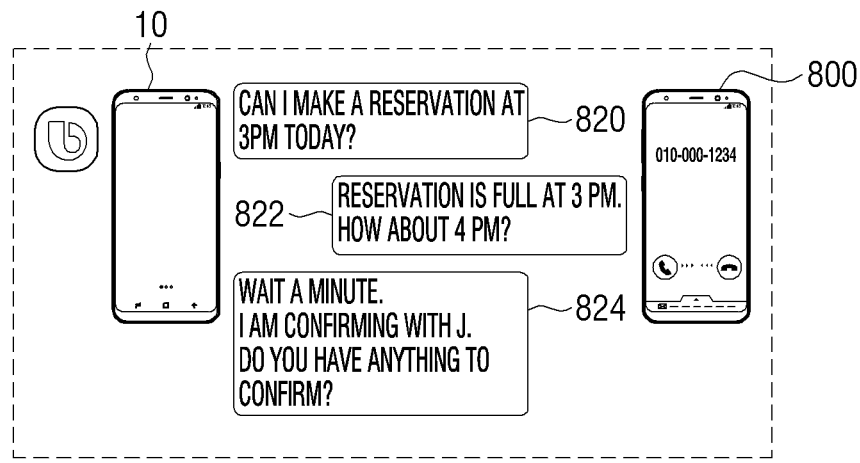
8-b

ELECTRONIC DEVICE AND METHOD OF CONTROLLING THEREOF

CROSS-REFERENCE TO RELATED APPLICATION

This application is based on and claims priority under 35 U.S.C. § 119 to Korean Patent Application No. 10-2018-0153683, filed on Dec. 3, 2018, in the Korean Intellectual Property Office, the disclosure of which is incorporated by reference herein in its entirety.

BACKGROUND

1. Field

The disclosure relates to an electronic device that transmits and receives text data or voice data with another electronic device using a digital assistant.

2. Description of Related Art

In addition to a traditional input method using a keyboard or a mouse, recent electronic devices may support various input methods such as a voice input. For example, an electronic device such as a smartphone or a tablet may recognize a user's voice input while a digital assistant function is executed, execute an operation corresponding to the voice input, or provide a search result.

The digital assistant function has been developed based on technology for processing a natural language. The technology for processing a natural language is for grasping an intention of a user's utterance and providing a user with a result corresponding to the intention.

In this case, the electronic device may provide a result using a display or provide a result by a voice.

SUMMARY

Embodiments of the disclosure address at least the above-mentioned problems and/or disadvantages and provide at least the advantages described below. Accordingly, an example aspect of the disclosure is to provide a method for identifying a situation where a user's confirmation is necessary when a digital assistant generates voice data or text data using a characteristic of user's utterance.

According to another example aspect of the disclosure, when the digital assistant generates voice data or text data using a characteristic of user's utterance, a method of outputting a display that the data is generated by the digital assistant is provided.

According to another example aspect of the disclosure, a method of generating and outputting new text data or voice data using at least a part of voice data or text that is received or transmitted with another electronic device by the digital assistant is provided.

According to an example embodiment, an electronic device includes a communication module comprising communication circuitry, a processor, and a memory, and the memory may store at least one command which, when executed by the processor, controls the electronic device to: execute an application for transmitting and receiving at least one of text data or voice data with another electronic device using the communication module in response to occurrence of at least one event, identify—whether confirmation is necessary using the digital assistant based on receiving at least one of text data or voice data from the another electronic device and based on at least one of text data or voice data being generated based on a characteristic of an utterance using a digital assistant, generate a notification requesting confirmation using the digital assistant based on the confirmation being necessary, and output the notification using the application.

According to an example embodiment, based on the electronic device generating voice data or text data based on a characteristic an utterance using the digital assistant, a situation where confirmation is necessary may be identified.

According to an example embodiment, based on the electronic device generating voice data or text data based on a characteristic of an utterance using the digital assistant, a display notifying that the data is generated by the digital assistant may be output.

According to an embodiment, the electronic device may generate and output new text data or voice data using at least a part of voice data or text data that is transmitted or received with another electronic device using the digital assistant.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 4 is a diagram illustrating an example in which an electronic device corresponds to a dialogue with a third party using a reply speed history of a user using a digital assistant according to an embodiment;

FIG. 8 is a diagram illustrating an example of guiding by an electronic device to a user of another electronic device while waiting for confirmation of a user using a digital assistant according to an embodiment;

The same reference numerals are used to represent the same elements throughout the drawings.

DETAILED DESCRIPTION

Figure 1:
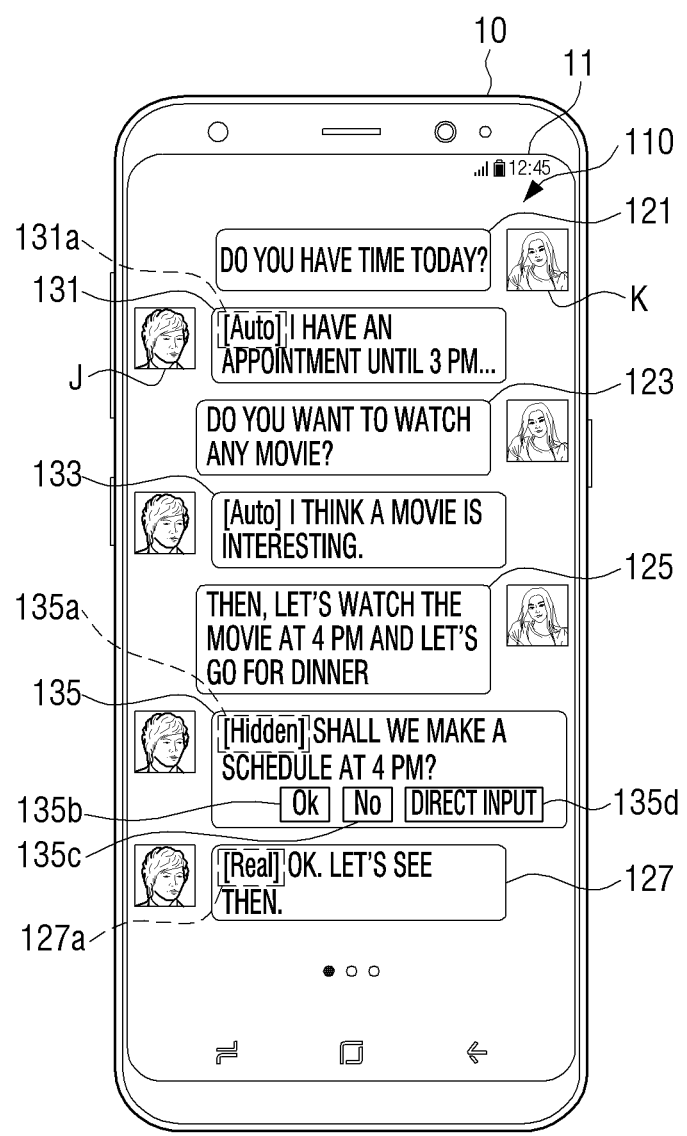
FIG. 1 is a diagram illustrating an example of sharing a text message with another electronic device using a digital assistant function according to an embodiment of the disclosure.

Hereinafter, various example embodiments of the disclosure will be described with reference to the accompanying drawings. However, it is to be understood that the disclosure is not limited to specific embodiments, but includes various modifications, equivalents, and/or alternatives according to embodiments of the disclosure. Throughout the accompanying drawings, similar components will be denoted by similar reference numerals.

The terms "have", "may have", "include", and "may include" used in the example embodiments of the present disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "at least one of A or/and B" includes (1) including at least one A, (2) including at least one B, or (3) including both at least one A and at least one B.

In addition, expressions "first", "second", or the like, used in the disclosure may indicate various components regardless of a sequence and/or importance of the components, may be used to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

When any component (for example, a first component) is (operatively or communicatively) coupled with/to or is connected to another component (for example, a second component), it is to be understood that any component may be directly coupled with/to another component or may be coupled with/to another component through the other component (for example, a third component). On the other hand, when any component (for example, a first component) is "directly coupled with/to" or "directly connected to" to another component (for example, a second component), it is to be understood that the other component (for example, a third component) is not present between the directly coupled components.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

FIG. 1 is a diagram illustrating an example of sharing a text message with another electronic device using a digital assistant function according to an embodiment.

The digital assistant function may refer, for example, to receiving and recognizing a user's voice or a text input by the user, and generating a command for operating an application in response to the user's voice or the text input by the user. Operating an application may refer, for example, to generating and outputting an answer in a form of voice or text in response to a user input. Operating an application may refer, for example, to performing at least one or more functions in response to a user input. However, the digital assistant function is not limited thereto.

According to various embodiments, the digital assistant function may refer, for example, to generating a command to operate an application in response to the voice data or text data received from another electronic device.

According to an example embodiment, a digital assistant function (hereinafter referred to as a digital assistant) may be implemented using an electronic device 10. The digital assistant may be implemented using the electronic device 10 and at least one server. The server may include a cloud server.

According to an example embodiment, the electronic device 10 may provide a function or a service that is necessary for a user through an application (or application program) (for example, a phone call application, a message application, a social network service (SNS) application) stored in the electronic device 10.

According to an embodiment, the electronic device 10 may include, for example, and without limitation, a mobile phone, a smartphone, a personal digital assistant (PDA), a mobile robot, an artificial intelligence (AI) speaker, various devices connectible to Internet such as a notebook computer, or the like.

Hereinafter, a situation in which the digital assistant is executed is described.

According to an embodiment, the electronic device 10 may receive a user's utterance as a user input. The electronic device 10 may receive a user's utterance and operate an application based on the user's utterance.

According to an embodiment, the electronic device 10 may implement a digital assistant in association with at least one server.

For example, the electronic device 10 may receive the user's utterance as a user input. The electronic device 10 may transmit the received utterance to at least one or more server. The at least one server may receive a user voice input from the electronic device 10 and change the user voice input to text data. The at least one server may generate (or select) a path rule based on text data. The path rule may include information on an action (or operation) for performing a function of an application or information about the parameters necessary to execute the operations. The path rule may also include an order of operation of the application. In addition, the path rule may include an order of operations of a plurality of applications. The electronic device 10 may receive the path rule, select the application according to the path rule, and execute the operation included in the path rule in the selected application.

According to an embodiment, the at least one server may include a database in which user information is stored. The at least one server may receive user information (for example, call logs, text input history, context information, application execution information, or the like) from the electronic device 10, and store the same in the database. The at least one server may use the information included in the database to generate a path rule for the user input.

According to an example embodiment, the at least one server may include a database in which information about functions stored in the electronic device 10, introduction of an application, or information on the functions to be provided are stored. For example, the at least one server may generate a database for functions that the user may use using the user information. The electronic device 10 may receive information about functions that may be provided from at least one server through a communication network and provide the received information to the user.

According to an example embodiment, the electronic device 10 may receive the user input as a text. For example, the electronic device 10 and the at least one server may perform the same operations as those described above, except for the operation of converting the user's utterance into text, and execute the operations included in the path rule.

According to an example embodiment, the electronic device 10 may perform the same or similar operations of the at least one server described above. For example, the electronic device 10 may receive the user's utterance and convert the user's utterance into text data using the digital assistant. The electronic device 10 may generate the path rule based on the text data. The electronic device 10 may select an application according to the path rule, and execute an operation included in the path rule in the selected application.

According to various embodiments, the at least one server or the electronic device 10 may include a learning model that enhances recognition capabilities through learning, such as a natural language understanding module, a natural language generation module, or the like. For example, the learning model may be a model trained using AI algorithms, such as, for example, and without limitation, machine learning, neural networks, deep learning algorithms, or the like. For example, the AI algorithm may be used in the process of recognizing the user's utterance and changing the utterance to the text data. A description thereof will be described in greater detail below with reference to FIGS. 9 and 10.

Referring to FIG. 1, the electronic device 10 may execute an application to receive or transmit at least one of the text data or voice data with another electronic device, in response to occurrence of at least one event.

The at least one event may refer, for example, to receiving, from a user, a command executing an application that transmits and receives at least one of text data or voice data with another electronic device. The at least one event may refer to receiving text data or voice data from another electronic device.

The application which receives or transmits at least one of the text data or voice data with another electronic device may be, for example, and without limitation, at least one of a message application, a voice call application, a social network service (SNS) application, or the like.

Hereinbelow, it is assumed and described that the electronic device 10 executes the digital assistance using a message application and performs dialogue with another electronic device. However, it will be understood that this is simply for convenience and ease of explanation, and that the disclosure is not limited thereto.

According to an embodiment, the electronic device 10 may execute a message application and display the text data generated in response to the user input on the display 11 and an execution screen 110 of the message application displaying text data received from another electronic device.

Referring to FIG. 1, the electronic device 10 may display a message "Do you have time today?" 121 received from another electronic device on the execution screen 110 of the message application. Information (for example, an image K of a counterpart) related to the counterpart using the message application via another electronic device may be displayed on the execution screen 110 of the message application.

According to an embodiment, when at least one of text data or voice data is received from another electronic device, the electronic device 10 may generate at least one of text data or voice data based on the user's utterance characteristic using a digital assistant and output the data using the application.

The electronic device 10 may generate the path rule based on the text data or voice data received from another electronic device using the digital assistant. For example, the electronic device 10 may generate the path rule to generate a reply, in response to "Do you have time today?" 121.

The electronic device 10 may generate the text data of "I have an appointment until 3 pm" 131 using the pre-stored characteristic of the user's utterance, transmit the text data to another electronic device, and display on the execution screen 110 of the message application. For example, the electronic device 10 may obtain the characteristic of the user's utterance using at least one of the call log, test input history of the user, and generate the text data to which the characteristic of the user's utterance of a user who does not correctly pronounce the end of the speech is reflected. The electronic device 10 may display information related to the user (for example, an image J of the user) on the execution screen 110 of the message application.

The electronic device 10 may generate a text using the user's context information (for example: location, time, etc.), application execution information (for example: web search history, information on applications executed a lot, information on a recently installed application, etc.). For example, the electronic device 10 may generate a sentence "I think A movie is interesting" 133 with respect to the text data received from another electronic device of "Do you want to watch any movie?" 123 using the search history of the user who searched A movie.

According to various embodiments, the electronic device 10 may transmit, to another electronic device, an indicator 131*a* indicating that the text data corresponding to the text received from another electronic device is generated and displayed using the digital assistant, along with the generated text data, and may display the indicator 131*a* on the execution screen 110 of the message application.

According to an embodiment, the electronic device 10 may identify a case where a user's confirmation is necessary using the digital assistance in a state where at least one of the text data or voice data is generated based on the characteristic of the user's utterance.

When the user's confirmation is necessary may be a case where confirmation on the user's instruction is necessary. For example, this may be a case in which some content included in the text data or voice data generated by the user is not the same as some content of the text data or voice data received from another electronic device.

The case where the user's confirmation is required may be, for example, a case that the text data or the voice data that the digital assistant should generate needs to determine whether to accept a proposal. For example, if a proposal is included in the text data or voice data received from the another electronic device, the electronic device 10 may identify this case as the case where a confirmation of the user is required, since a prudent reply may be necessary.

The case where the user's confirmation is necessary may be a case, for example, where the user has a history that the user utters a voice similar to the voice data that the digital assistant should generate, and confirmation of the user's utterance response time is necessary. In other words, if the user's time corresponding to the other party's voice is longer than a predetermined time (for example, more than the user's average reply ownership time), it may be a situation that a prudent reply is required, so that the electronic device 10 may identify this case as the case that the confirmation from the user is necessary.

The case where the user's confirmation is necessary may be, for example, a case where similarity of at least some content of the text data or voice data received from another electronic device and text data or voice data prestored in the electronic device is less than or equal to a predetermined value. This case may be a case requiring a prudent reply and thus, the electronic device 10 may identify the case as a case requiring the user's confirmation.

Referring to FIG. 1, the electronic device 10 may display "Then, let's watch the movie at 4 pm and let's go for dinner" 125 on the execution screen 110 of the message application.

For example, the electronic device 10 may identify that the proposal of the counterpart is included in the content of the received message. The electronic device 10 may identify that the user's confirmation is necessary in a situation that the text data is generated in response to "Then, let's watch the movie at 4 pm and let's go for dinner" 125 received from the another electronic device, based on the identified result.

According to an embodiment, the electronic device 10 may, while the user's confirmation is being necessary, generate a notification requesting the user's confirmation using the digital assistant, and output the notification using the application.

Referring to FIG. 1, the electronic device 10 may generate a notification requesting the user's confirmation in response to "Then, let's watch the movie at 4 pm and let's go for dinner" 125 received by the another electronic device using the digital assistant.

The notification requesting confirmation to the user may include, for example, based on the text data received from the another electronic device, the text data for the appointment at 4 pm and a selection object that may receive the user's input regarding the text data. Referring to FIG. 1, the electronic device 10, using the digital assistant, may generate the text data "Shall we make a schedule at 4 pm?" 135, an object 135*b* that receives confirmation, an object 135*c* that receives rejection, and an object 135*d* that receives a user's direct input progress, and display the same on the execution screen 110 of a message application. In this case, the electronic device 10 may display the text data regarding the 4 pm appointment along with the indicator 135*a* indicating that the selected object that is capable of receiving the user's input has not been transmitted to the another electronic device.

Referring to FIG. 1, the electronic device 10 may transmit the user's direct input "OK. Let's see then" 127 that is directly input by the user to the another device, and display the same on the execution screen 110 of the message application. For example, the electronic device 10 may display a pop-up window for inputting a text, in response to a user's input of selecting the object 135*d* for receiving the direct input progress. The electronic device 10 may transmit the input text data to another electronic device through a popup window for inputting text and display the text data on the execution screen 110 of the message application.

According to various embodiments, the electronic device 10 may generate and display the text data corresponding to the text received from the another electronic device using at least one server. For example, the electronic device 10 may transmit the text data received from another electronic device to at least one server, receive the text data that is generated by at least one server based on the received text data, and display the text data on the execution screen 110 of the message application.

According to various embodiments, the electronic device 10 may register a schedule based on the content of text data or voice data that is received or transmitted from or to the another electronic device using the digital assistant. For example, the electronic device 10 may add a schedule to visit B hair salon at 4 pm to the schedule application using the digital assistant and notify the user of adding the schedule by executing the schedule application.

According to various embodiments, the electronic device 10 may provide a notification to a user using various methods when user's confirmation is required. For example, the electronic device 10 may provide a user interface for selecting an application for providing a notification to a user by the digital assistant. For example, the electronic device 10 may guide to select at least one of a call application, an e-mail application, an SMS application, and a message application. In addition, the electronic device 10 may guide to use all of the above-described applications or select the priority of the operation with respect to the aforementioned application.

As described above, according to an example embodiment, the electronic device 10 may generate the text data or voice data in response to the text data or voice data received from the another electronic device using the digital assistant, in place of the user. For example, the electronic device 10 may identify a situation where the user's confirmation is necessary using the digital assistant and provide the user of a notification. When a prudent decision is necessary, the user may actively intervene in the dialogue between the digital assistant and a third party.

Figure 2:
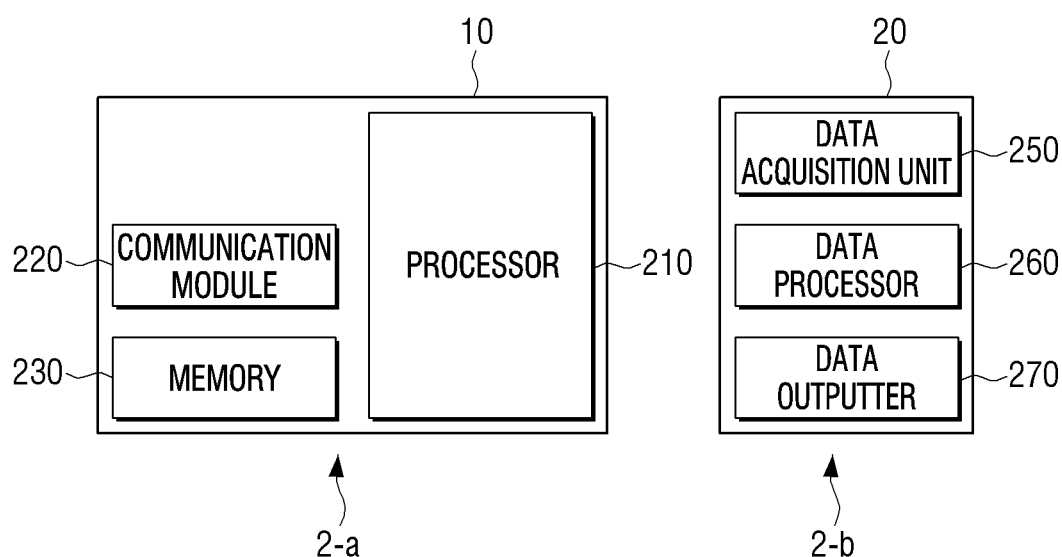
FIG. 2 is a block diagram illustrating an example electronic device and a server according to an embodiment.

FIG. 2 is a block diagram illustrating an example electronic device and server according to an embodiment.

Referring to 2-a of FIG. 2, the electronic device 10 may include a processor (e.g., including processing circuitry) 210, a communication module (e.g., including communication circuitry) 220, and a memory 230, but is not limited thereto. The electronic device 10 may omit a part of the components or include additional components.

According to an embodiment, the processor 210 may execute a program stored in the memory 230 by controlling the memory 230 and retrieve or store necessary information.

For example, the processor 210, may include various processing circuitry and in response to at least one event occurrence, may execute an application for transmitting or receiving at least one of the text data or voice data with another electronic device using the communication module, and when at least one of the text data or voice data is received from the another electronic device, generate at least one of the text data or voice data based on the characteristic of the user's utterance using the digital assistant, output the data using the application, and in the situation where at least one of the text data or voice data is generated based on the characteristic of the user's utterance, identify a situation where the user's confirmation is necessary using the digital assistant, and in the situation where the user's confirmation is necessary, generate a notification requesting the user of confirmation using the digital assistant, and output the notification using the application.

According to an embodiment, the communication module 220 may include various communication circuitry and connect the electronic device 10 with an external device (for example: another electronic device, a server, or the like) under the control of the processor 210. The communication module 220 may include various components including various communication circuitry which implement various wired or wireless communication methods such as, for example, and without limitation, wireless local area network (LAN), Bluetooth, wired Ethernet, or the like, to correspond to the function and structure of the electronic device 10.

According to an embodiment, the memory 230 may store an application for transmitting and receiving at least one of text data or voice data with another electronic device using the communication module in response to at least one event occurrence. When at least one of the text data or the voice data is received from another electronic device, using the digital assistant, at least one of the text data or the voice data may be generated based on the characteristic of user's utterance, and the data may be output using the application. In a situation in which at least one of text data or voice data is generated based on the characteristic of the user's utterance, a situation where the user's confirmation is necessary is identified using the digital assistant, and in the situation where the user's confirmation is necessary, a notification requesting the user's confirmation may be generated using the digital assistant, and commands that are set to output the application may be stored.

Referring to 2-b of FIG. 2, a server 20 may include a data acquisition unit (e.g., including data acquisition circuitry) 250, a data processor (e.g., including data processing circuitry) 260, and a data outputter (e.g., including data output circuitry) 270. The server 20 may include at least one server as illustrated in FIG. 1.

According to an embodiment, the data acquisition unit 250 may include various data acquisition circuitry, such as, for example, and without limitation various processing circuitry and/or executable program elements, and acquire at least one of the text data or voice data from an external device.

According to an embodiment, the data processor 260 may include various data processing circuitry, such as, for example, and without limitation, various processing circuitry and/or executable program elements, and, when at least one of the text data or voice data is received from the external device, may generate at least one of the text data or voice data based on the characteristic of the user's utterance using the digital assistant. The data processor 260, while at least one of the text data or voice data is generated, may identify the situation where the user's confirmation is necessary using the digital assistant.

According to an embodiment, the data outputter 270 may include various data outputting circuitry and transmit the generated text data or voice data to an external device. The data outputter 270, in a situation where the user's confirmation is necessary, may transmit information on the situation where the user's confirmation is necessary, to the external device.

Figure 3:
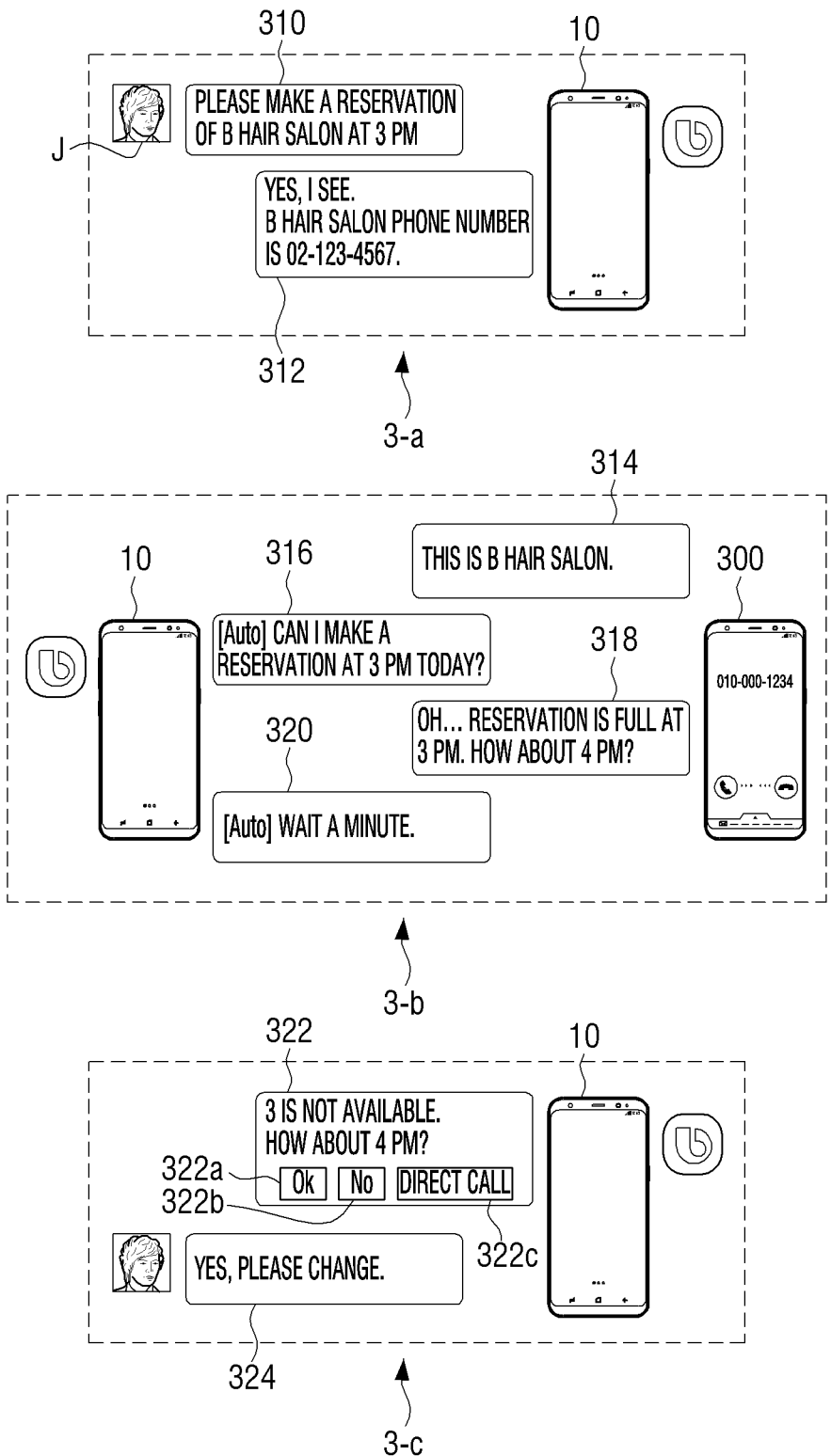
FIG. 3 is a diagram illustrating an example in which an electronic device identifies and responds to a case where an opinion of a user is not consistent with an opinion of a third party using a digital assistant according to an embodiment.

FIG. 3 is a diagram illustrating an example in which an electronic device identifies and responds to a case where an opinion of a user is not consistent with an opinion of a third party using a digital assistant according to an embodiment.

Referring to 3-a of FIG. 3, the electronic device 10 may receive the utterance of the user J. For example, the electronic device 10 may receive the utterance of the user J of "please make a reservation of B hair salon at 4 pm" 310. The electronic device 10 may convert the received utterance to the text data.

According to an embodiment, the electronic device 10 may generate the path rule based on the text data using the digital assistant. The electronic device 10 may select an application according to the path rule, and execute an operation included in the selected application.

For example, the electronic device 10 may perform an operation of generating and outputting a notification informing that the utterance of the user J has been received using the digital assistant. In addition, the electronic device 10 may execute an operation of making a reservation by calling B hair salon. For example, the electronic device 10 may generate a voice data, "Yes, I see. B hair salon phone number is 02-123-4567" 312 using the digital assistant and output the same using a microphone (not shown). The electronic device 10 may generate text data "Yes, I see. B hair salon phone number is 02-123-4567" 312 using the digital assistant, and output the text data using the message application execution screen.

In FIG. 3, 3-b illustrates an example in which the electronic device 10 makes a call according to the generated path rule.

According to an embodiment, the electronic device 10 may execute a call application to make a phone call to B hair salon using the digital assistant in reference numeral 3-a of FIG. 3, and generate a path rule to make a reservation by generating voice data in response to the dialogue of the counterpart.

Referring to 3-b of FIG. 3, the electronic device 10 may start a call with another electronic device 300 by executing a call application. The electronic device 10 may receive voice data "This is B hair salon" 314 through the call application. In response to the received voice, the electronic device 10 may generate voice data, "Can I make a reservation at 3 pm today?" 316, and transmit the voice data to the another electronic device 300 with which call is connected using the call application.

The electronic device 10 may receive the voice data "Oh . . . reservation is full at 3 pm. How about 4 pm?" 318 through the call application.

According to an embodiment, the electronic device 10 may identify that the received voice includes a content of requesting 4 pm that is different from the reservation time 3 pm included in the voice that is generated and transmitted previously.

Based on that the reservation time requested by the user J and the reservation time included in the voice received from another electronic device 300 is different, the electronic device 10 may generate and output a notification requesting confirmation of the user J using the digital assistant. In this example, the electronic device 10 may generate and transmit the voice "Wait a minute" 320 to the another electronic device 300 using the digital assistant, so that the counterpart using the another electronic device 300 can wait.

Referring to 3-c of FIG. 3, the electronic device 10 may generate a notification requesting the user's confirmation using the digital assistant.

The notification for requesting confirmation to the user J may be, for example, voice data including the content to change the reservation time which was 3 pm to 4 pm, based on the voice data received by the another electronic device 300. According to various embodiments, the electronic device 10 may generate a notification requesting user's confirmation with text data. In this example, the notification requesting user's confirmation may be text data 322 including a change in the reservation time from 3 pm to 4 pm, an object 322a for approving the change in the reservation time, an object 322b for rejecting the reservation time, and an object 322c that directly performs a call. The electronic device 10 may generate a notification requesting user's confirmation and display the notification on the execution screen of the message application.

According to an embodiment, when the user's voice "Yes, please change" 324 to approve the change in the reservation time is received, the electronic device 10 may generate a voice to proceed the change in the reservation time using the digital assistant, and transmit the voice to the another electronic device 300 using the call application.

As such, according to an embodiment, when some content of the user's request is different from some content included in the voice data received from the another electronic device, the electronic device 10 may output a notification requesting the user for confirmation.

FIG. 4 is a diagram illustrating an example in which an electronic device corresponds to a dialogue with a third party using a reply speed history of a user using a digital assistant according to an embodiment.

Referring to 4-a of FIG. 4, the electronic device 10 may receive utterance of the user J. For example, the electronic device 10 may receive utterance of the user J, "please make a reservation of B hair salon at 3 pm" 410. The electronic device 10 may convert the received utterance to the text data.

According to an embodiment, the electronic device 10 may generate the path rule based on the text data using the digital assistant. The electronic device 10 may select an application according to the path rule, and execute an operation included in the selected application.

For example, the electronic device 10 may perform an operation of generating and outputting a notification guiding that the utterance of the user J has been received using the digital assistant. In addition, the electronic device 10 may execute an operation of making a reservation by calling B hair salon. For example, the electronic device 10 may generate a voice data "Yes, I see. B hair salon phone number is 02-123-4567" 412 using the digital assistant, and output the voice data using a microphone (not shown). The electronic device 10 may generate text data, "Yes, I see. B hair salon phone number is 02-123-4567" 412 using the digital assistant, and output the text data using the message application execution screen.

In FIG. 4, 4-b illustrates an example of making a call according to the generated path rule.

According to an embodiment, the electronic device 10 may execute a call application to make a call to B hair salon using the digital assistant in 4-a of FIG. 4, generate the voice data in response to the dialogue of the counterpart, and generate the path rule to proceed reservation.

Referring to 4-b of FIG. 4, the electronic device 10 may start a call with another electronic device 400 by executing a call application. The electronic device 10 may receive voice data "This is B hair salon" 414 through a call application. In response to the received voice, the electronic device 10 may generate voice data, "Can I make a reservation at 3 pm today?" 416, and transmit the voice data to the another electronic device 400 to which call is connected, using the call application.

The electronic device 10 may receive the voice data of "Yes, how do you like your hair cut?" 418 through the call application.

According to an embodiment, the electronic device 10 may identify the time which is required for making a reply by a user for received voice.

Based on the user J's reply after having spent more than a predetermined time in the past with respect to the voice data "Yes, how do you like your hair cut?", the electronic device 10 may generate and output a notification requesting from the user J using the digital assistant. In this example, the electronic device 10 may generate and transmit a voice "wait a minute" 420 to the another electronic device 300 using the digital assistant so as to induce the counterpart using the another electronic device to wait.

Referring to 4-c of FIG. 4, the electronic device 10 may generate a notification for requesting the user's confirmation using the digital assistant.

The notification requesting the user J of confirmation may be voice data notifying that an inquiry is being made about a hair style based on the voice data received by another electronic device 400, for example. According to various embodiments, the electronic device 10 may generate a notification for requesting the user's confirmation with text data. In this example, the notification for requesting the user's confirmation may be text data 422 notifying that an inquiry is being made about a hair style. The electronic device 10 may generate a notification requesting the user's confirmation and display the notification on the execution screen of the message application.

According to an embodiment, when the user's voice to determine the hair style of "sports hair" 424 is received, the electronic device 10 may generate a voice notifying the hair style and transmit the voice to the another electronic device 400 using a call application.

According to an embodiment, the electronic device 10 may output a notification for requesting the user of confirmation using information on a past reply speed of the user using the digital assistant.

Figure 5:
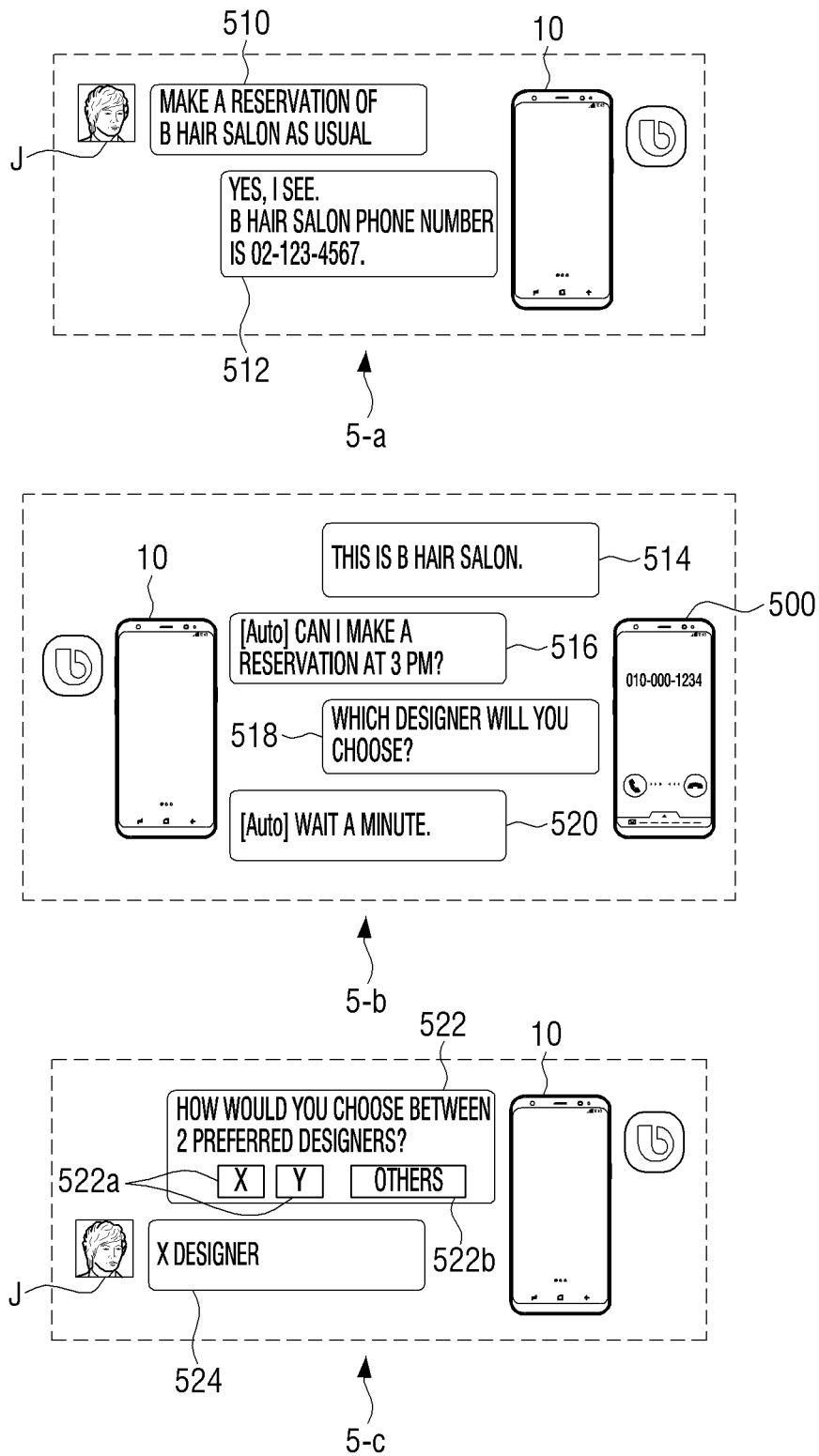
FIG. 5 is a diagram illustrating an example in which an electronic device confirms new information and responds to a dialogue with a third party using a digital assistant according to an embodiment.

FIG. 5 is a diagram illustrating an example in which an electronic device confirms new information and responds to a dialogue with a third party using a digital assistant according to an embodiment.

Referring to 5-a of FIG. 5, the electronic device 10 may receive the utterance of the user J. For example, the electronic device 10 may receive the utterance of the user J of "Make a reservation of B hair salon as usual" 510. The electronic device 10 may convert the received utterance to the text data.

According to an embodiment, the electronic device 10 may generate the path rule based on the text data using the digital assistant. The electronic device 10 may select an application according to the path rule, and execute an operation included in the selected application.

For example, the electronic device 10 may perform an operation of generating and outputting a notification guiding that the utterance of the user J has been received using the digital assistant. In addition, the electronic device 10 may identify that the user J has a plurality of histories of making a reservation for X designer of B hair salon at 3 pm. In addition, the electronic device 10 may execute an operation of making a reservation by calling B hair salon.

For example, using the digital assistant, the electronic device 10 may generate the voice data, "Yes, I see. B hair salon phone number is 02-123-4567" 512, and output the voice data using a microphone (not shown). The electronic device 10 may generate the text data "Yes, I see. B hair salon phone number is 02-123-4567" 512 and output the voice data using the message application execution screen.

In FIG. 5, 5-b illustrates an example of making a call by the electronic device 10 according to the generated path rule.

According to an embodiment, the electronic device 10 may execute a call application to make a call to B hair salon using the digital assistant in 5-a of FIG. 5, generate the voice data in response to the dialog of the counterpart, and generate the path rule to make a reservation.

Referring to 5-b of FIG. 5, the electronic device 10 may start a call with another electronic device 500 by executing a call application. The electronic device 10 may receive voice data "This is B hair salon" 514 through a call application. In response to the received voice, the electronic device 10 may generate voice data, "Can I make a reservation at 3 pm today?" 516, and transmit the voice data to the another electronic device 500 to which a call is connected using the call application.

The electronic device 10 may receive the voice data of "Which designer will you choose?" 518 from the another electronic device 500 through the call application.

According to an embodiment, the electronic device 10 may identify whether the received voice data has a new content, using the digital assistant.

Based on that there is no obtained history, for the voice data "which designer will you choose?" 518, the electronic device 10 may generate and output a notification requesting confirmation to the user J using the digital assistant. In this example, the electronic device 10 may generate and transmit a voice called "Wait a minute" 520 to the another electronic device 500 using the digital assistant to induce the counterpart using the another electronic device 500 to wait.

Referring to 5-c of FIG. 5, the electronic device 10 may generate a notification requesting the user's confirmation using the digital assistant.

Notification for requesting confirmation to the user may be voice data indicating that an inquiry is being made to the designer based on the voice data received from the another electronic device 500, for example. According various embodiments, the electronic device 10 may generate a notification requesting user confirmation with text data. In this case, the notification requesting the user confirmation may be text data 522 indicating that the designer is making an inquiry, objects 522a for selecting a designer, and objects 522b for directly making a call. The electronic device 10 may generate a notification requesting user confirmation and display the notification on an execution screen of a message application.

According to an embodiment, when a voice of the user J for requesting finalization of a designer of "X designer" 524 is received, the electronic device 10 may generate a voice for requesting finalization of the designer using the digital assistant, and transmit the voice to the another electronic device 500 using the call application.

According to an embodiment, when a new content that has not been present in the dialogue history is obtained using the digital assistant, the electronic device 10 may output a notification for requesting the user's confirmation.

Figure 6:
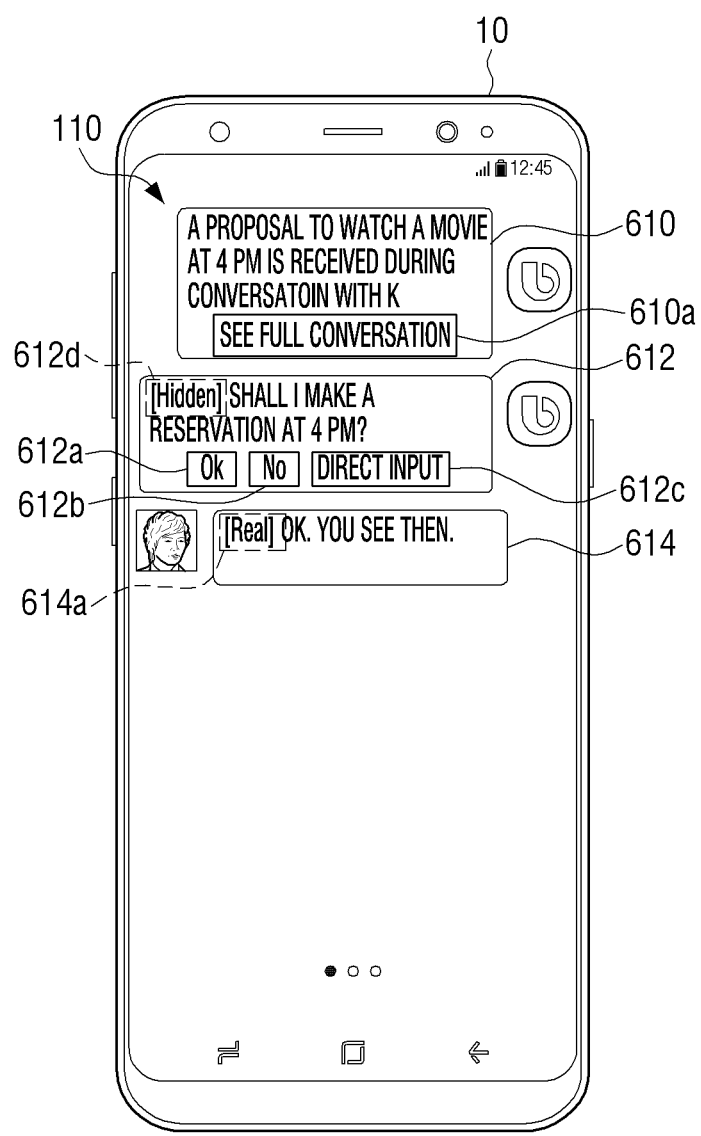
FIG. 6 is a diagram illustrating an example of summarizing and displaying a dialogue content by an electronic device using a digital assistant according to an embodiment.

FIG. 6 is a diagram illustrating an example of summarizing and displaying a dialogue content by an electronic device using a digital assistant according to an embodiment.

According to an embodiment, the electronic device 10 may generate summary text data using a content included in text data transmitted and received with another electronic device using the digital assistant and provide the same to the user. For example, the electronic device 10 may generate summary text data and provide the same to the user when the user does not confirm at least some content of the text data transmitted and received by the digital assistant and the another electronic device. However, the situation in which the electronic device 10 provides summary text data using the digital assistant is not limited thereto.

According to an embodiment, the summary text data may include a name of a counterpart using another electronic device. In addition, the summary text data may include content that needs the user's confirmation. For example, the summary data may include at least one of a case where the confirmation of the user's instruction is necessary, a case where a proposal is included in the text data received from the another device, a case where the text data which is the same as the case where the user made a reply after spending a predetermined time on the utterance received from the other electronic device is received, and a case where the similarity between the text data or voice data received from another electronic device and the text data or voice data previously stored in the electronic device is less than or equal to a predetermined value.

Referring to FIG. 6, the electronic device 10 may generate a summary text data, "A proposal to watch A movie at 4 pm is received during the dialogue with K" 610 using the digital assistant and display the data on the execution screen 110 of the message application. In this case, the electronic device 10 may display an entire view object 610a that displays all the contents included in the text data transmitted and received with another electronic device using the digital assistant.

According to an embodiment, the electronic device 10 may generate and display text data requesting confirmation of a user using the digital assistant.

Referring to FIG. 6, the electronic device 10 may generate text data of "Shall I make a reservation at 4 pm?" 612, an object 612a receiving an approval, an object 612b that receives a rejection, and an object 612c that receives the user's direct input progress using the digital assistant, and may display the same on the execution screen 110 of the message application. In this example, the electronic device

10 may display the text data for the 4 pm appointment and an indicator 612d indicating that the selected object that is capable of receiving the user's input has not been transmitted to the another electronic device.

According to an example embodiment, the electronic device 10 may transmit "Okay, see you then" 614 that is directly input by the user to the another electronic device, and display the same on the execution screen 110 of the message application. For example, the electronic device 10 may display a pop-up window for inputting a text in response to a user's input of selecting an object 612c that receives the direct input progress. The electronic device 10 may transmit the input text data to another electronic device through a popup window for inputting text and display the text data on the execution screen 110 of the message application. In this case, the electronic device 10 may also display an indicator 614a indicating that "Okay, see you then" 612 has been generated by the user's direct input.

Figure 7:
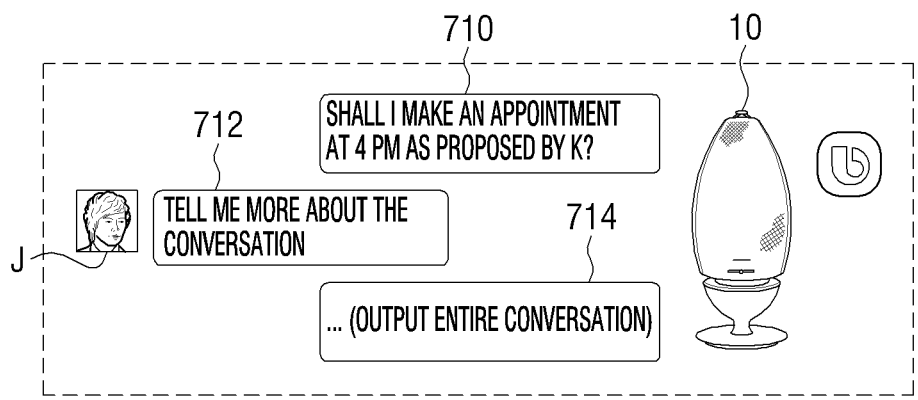
FIG. 7 is a diagram illustrating an example of summarizing and displaying a dialogue content by an electronic device using a digital assistant according to various embodiments.

FIG. 7 is a diagram illustrating an example of summarizing and displaying a dialogue content by an electronic device using a digital assistant according to various embodiments.

According to an embodiment, the electronic device 10 may be an AI speaker. The electronic device 10 may generate the summary voice data using the voice data which has been received or transmitted from or to the another electronic device using the digital assistant and provide the same to the user.

According to an embodiment, the summary voice data may include a name of a counterpart using another electronic device. In addition, the summary voice data may include content that needs confirmation of the user. For example, the summary voice data may include at least one of a case where the confirmation of the user's instruction is necessary, a case where a proposal is included in the text data received from the another device, a case where the voice data which is the same as the case where the user made a reply after spending a predetermined time on the utterance received from the other electronic device is received, and a case where the similarity between the text data or voice data received from another electronic device and the text data or voice data previously stored in the electronic device is less than or equal to a predetermined value.

Referring to FIG. 7, the electronic device 10 may generate and output summary voice data, "Would you like to make an appointment at 4 pm as proposed by K?" 710 using the digital assistant. The electronic device 10 may receive a user's utterance "tell me more about the conversation" 712. The electronic device 10 may output the entire voice data 714 transmitted and received with another electronic device using the digital assistant based on the user's utterance.

According to an embodiment, the electronic device 10 may summarize at least some content of the voice data or text data which has been transmitted or received with the another electronic device using the digital assistant and provide the user with the same, and may guide the user to grasp main content while saving time.

FIG. 8 is a diagram illustrating an example of guiding by an electronic device to a user of another electronic device while waiting for confirmation of a user using a digital assistant according to an embodiment.

As described above, referring to 3-a of FIG. 3, the electronic device 10 may execute a call application to make a call to B hair salon using the digital assistant, and generate the path rule to proceed a reservation by generating the voice data in response to the dialogue of the counterpart.

Referring to 8-a of FIG. 8, the electronic device 10 may generate voice data indicating that a call is being made using the digital assistant at the time when a call with an another electronic device 800 is started, and transmit the voice data to the another electronic device 800. For example, the electronic device 10 may generate voice data "Hello, this is a digital assistant on behalf of J" 810 and transmit the voice data to the another electronic device 800.

The electronic device 10 may generate the voice data of "Can I make a reservation at 3 pm today?" 812 and transmit the voice data to the another electronic device 800 using the call application.

The electronic device 10 may receive the voice data of "reservation is full at 3 pm, but 4 pm is available" 814 from the another electronic device 800.

According to an embodiment, the electronic device 10 may identify that, using the digital assistant, the content requesting the reservation time 4 pm which is different from 3 pm, which is included in the pre-generated voice transmitted to the received voice, as the reservation time. Based on the difference between the reservation time requested by the user and the reservation time included in the voice received from another electronic device, the electronic device 10 may generate and output a notification requesting confirmation from the user using the digital assistant.

The electronic device 10 may generate the voice data requesting wait to the another electronic device 800 using the digital assistant and transmit the same. For example, the electronic device 10 may generate and transmit the voice data "Wait a minute. I am confirming with J" 816 using the digital assistant.

According to various embodiments, if the time at which the confirmation of the user is received is longer than a predetermined time (for example, 2 to 3 minutes), the electronic device 10 may generate and transmit voice data to call back to the another electronic device 800 using the digital assistant. For example, the electronic device 10 may generate and transmit voice data, "Sorry. I will call you again after confirmation" 818 using the digital assistant.

Referring to 8-b of FIG. 8, the electronic device 10 may generate the voice data "Can I make a reservation at 3 pm today?" 820 and transmit the voice message to the another electronic device 800 using the call application.

The electronic device 10 may receive the voice data "reservation is full at 3 pm, but 4 pm is available" 822 from the another electronic device 800 through the call application.

According to an embodiment, the electronic device 10 may identify that a content to request a reservation time of 4 pm that is different from 3 pm that is included as the reservation time included in a voice previously generated and transmitted is included in the received voice. Based on the difference between the reservation time requested by the user and the reservation time included in the voice received from the another electronic device 800, the electronic device 10 may generate and output a notification requesting confirmation to the user using the digital assistant.

In addition, the electronic device 10 may generate and transmit voice data to check whether there is a request for other contents that are different from contents requested by the user to the another electronic device 800 using the digital assistant. For example, the electronic device 10 may generate voice data, "Wait a minute, I will check with J. Do you have anything else to confirm?" 824 and transmit the voice data to the another electronic device.

According to an embodiment, the electronic device 10 may additionally transmit the voice data to the another electronic device according to time that is required for a user to respond to the notification requesting confirmation of the user.

Figure 9:
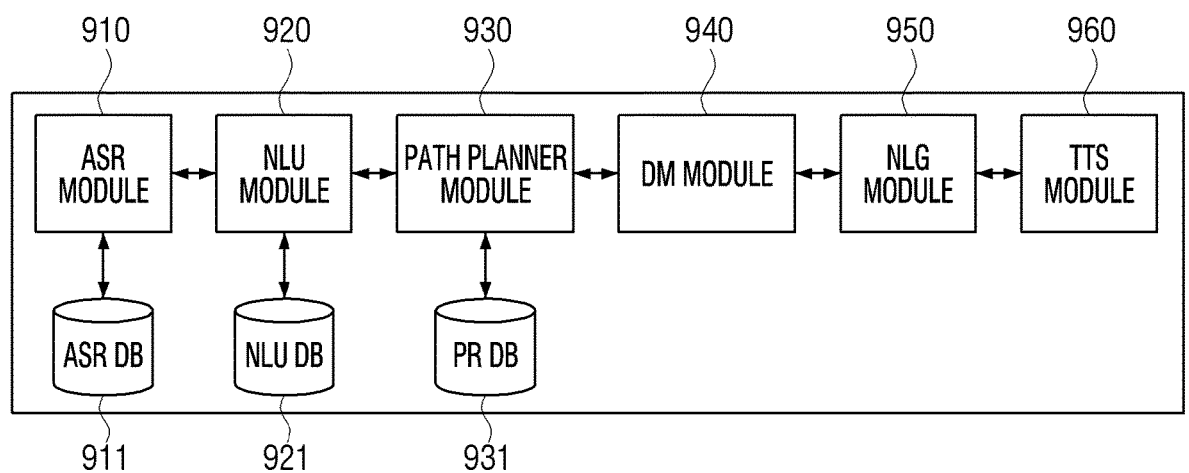
FIG. 9 is a block diagram illustrating an example process of executing a digital assistant according to an embodiment.

FIG. 9 is a block diagram illustrating an example process of executing a digital assistant according to an embodiment.

Referring to FIG. 9, a server (for example: the server 20 of FIG. 2) or the electronic device 10 may include an automatic speech recognition ASR module (e.g., including processing circuitry and/or executable program elements) 910, a natural language understanding NLU module (e.g., including processing circuitry and/or executable program elements) 920, a path planner module (e.g., including processing circuitry and/or executable program elements) 930, a dialogue manager DM module (e.g., including processing circuitry and/or executable program elements) 940, a natural language generator NLG module (e.g., including processing circuitry and/or executable program elements) 950 and/or a text to speech TTS module (e.g., including processing circuitry and/or executable program elements) 960.

According to an embodiment, the electronic device 10 may store the plurality of above-described modules in a memory (for example: the memory 230 of FIG. 2). The server 20 may store the plurality of above-described modules in a data processor (for example: the data processor 260 of FIG. 2).

According to an embodiment, the ASR module 810 may include various processing circuitry and/or executable program elements and convert the user input to text data.

According to an embodiment, the ASR module 910 may convert the user input into text data. For example, the ASR module 910 may include a speech recognition module. The speech recognition module may include an acoustic model and a language model. For example, the acoustic model may include information related to vocalization, and the language model may include information on unit phoneme information and a combination of unit phoneme information. The speech recognition module may convert the user's utterance into text data using the information related to vocalization and information on the unit phoneme information. Information about the acoustic model and language model may be stored in, for example, an automatic speech recognition database (ASR DB) 911.

As an embodiment, the NLU module may include various processing circuitry and/or executable program elements and recognize the intention of a user by performing syntactic analysis or semantic analysis. Grammatical analysis may divide the user input in grammatical units (e.g., words, phrases, morphemes, or the like), and may grasp which grammatical elements the divided units may have. The semantic analysis may be performed using semantic matching, rule matching, formula matching, or the like. Accordingly, the NLU module may acquire domain, intent, or parameter for expressing the intent by the user input.

As another embodiment, the NLU module 920 may determine user intention and parameters using the matching rule divided into a domain, an intention, and a parameter (or a slot) for grasping the intention. For example, the one domain (e.g., an alarm) may include a plurality of intents (e.g., alarm setting, alarm cancellation, or the like), and one intention may include a plurality of parameters (e.g., time, repetition times, alarm sound, or the like). The plurality of rules may include, for example, one or more mandatory element parameters. The matching rule may be stored in a natural language understanding database (NLU DB) 921.

As a still another embodiment, the NLU module 920 may grasp the meaning of a word extracted from a user input using a linguistic characteristic (e.g., a grammatical element) such as a morpheme or a phrase, and determine a user intention by matching the grasped meaning with the domain and the intention. For example, the NLU module 920 may determine the user's intention by calculating how many words extracted from user input are included in each domain and intention.

According to an example embodiment, the NLU module 920 may determine the parameters of the user input using words that become a basis for understanding the intent. According to an example embodiment, the NLU module 920 may determine the user's intention using the natural language recognition database 921 in which the linguistic characteristic for grasping the intention of the user input is stored.

As still another embodiment, the NLU module 920 may determine a user's intention using a personal language model (PLM). For example, the NLU module 920 may determine the user's intention using personalized information (e.g., contact list, music list). The personalized language model may be stored in, for example, natural language recognition database 921. According to an embodiment, not only the NLU module 920 but also the ASR module 910 may recognize the user's voice using a personalized language model stored in the natural language recognition database 921.

As an embodiment, the NLU module 920 may generate a path rule based on the intent and a parameter of a user input. For example, the NLU module 920 may select an application to be executed based on the intention of a user input, and determine an action to be performed in the selected application. The NLU module 920 may generate the path rule by determining a parameter corresponding to the determined action. According to an example embodiment, the path rule generated by the NLU module may include an application to be executed, an action (e.g., at least one state) to be executed in the application, and information about parameters for executing the action.

As another embodiment, the NLU module 920 may generate one path rule or a plurality of path rules based on the intention and parameter of the user input. For example, the NLU module 920 may receive a path rule set corresponding to the first electronic device 10 from a path planner module 930, and determine the path rule by mapping the intention and the parameter of the user input to the received path rule set.

As still another embodiment, the NLU module 920 may generate one or a plurality of path rules by determining an application to be executed based on the intention and parameter of the user input, an action to be executed in an application, and a parameter for executing the action. For example, the NLU module 920 may generate the path rule by arranging the application to be executed or the action to be executed by the application in an ontology or graph model according to the intention included in the voice. The generated path rule may be stored in a path rule database PR DB 931 through the path planner module 930, for example. The generated path rule may be added to a path rule set of the path rule database 931.

As still another embodiment, the NLU module 920 may select at least one path rule from among a plurality of generated path rules. For example, the NLU module may select an optimal path rule from among the plurality of path rules. For example, the NLU module 920 may select a plurality of path rules when only some actions are specified based on user utterance. The NLU module 920 may determine one path rule among the plurality of path rules by an additional input of the user.

According to an embodiment, the path planner module 930 may include various processing circuitry and/or executable program elements and select at least one path rule among a plurality of path rules.

According to an embodiment, the path planner module 930 may transmit a path rule set including a plurality of path rules to the NLU module 920. The plurality of path rules of the path rule set may be stored in a form of a table in a path rule database 231 connected to the path planner module 930. The table stored in the path rule database 231 may be stored, for example, by domains or versions of a domain.

According to an embodiment, the path planner module 930 may select one path rule or a plurality of path rules from the path rule set and transmit the same to the NLU module 920. For example, the path planner module 930 may match the user's intention and parameter with the path rule set corresponding to the user terminal 100, select one path rule or a plurality of path rules, and transmit the same to the NLU module 920.

According to an embodiment, the path planner module 930 may generate one path rule or a plurality of path rules using intentions and parameters included in the voice. For example, the path planner module 930 may generate one path rule or a plurality of path rules by determining an application to be executed and an operation to be executed in the application based on the intention and the parameters included in the voice. According to an embodiment, the path planner module 930 may store the generated path rule in the path rule database 931.

According to an embodiment, the path planner module 930 may store the path rule generated in the NLU module 920 in the path rule database 931. The generated path rule may be added to the path rule set stored in the path rule database 931.

According to an embodiment, a table stored in the path rule database 931 may include a plurality of path rules or a plurality of path rule sets. The plurality of path rules or the plurality of path rule sets may reflect a kind, a version, a type, or a characteristic of an apparatus for performing each path rule.

According to an example embodiment, the dialogue manager DM module 940 may include various processing circuitry and/or executable program elements and determine whether the intention included in the voice determined by the NLU module 920 is clear. For example, the dialogue manager module 940 may determine whether the intention included in the voice is clear based on whether the information of the parameter is sufficient. The dialogue manager module 940 may determine whether the parameters identified in the NLU module 920 are sufficient to perform a task. According to an embodiment, when the intention included in the voice is not clear, the dialogue manager module 940 may perform feedback for requesting necessary information to the user. For example, the dialogue manager module 940 may perform feedback requesting information about a parameter for determining the user's intention.

According to an example embodiment, the natural language generation NLG module 950 may include various processing circuitry and/or executable program elements and change the designated information into a text form. The information changed in the form of text may be in a form of natural language speech. The designated information may be, for example, information about an additional input, information for guiding completion of an operation corresponding to the user input, or information (for example: feedback information for the user input) for guiding an additional input of the user. The information changed in the form of text may be displayed on the display or changed in the form of voice.

According to an embodiment, the TTS module 960 may include various processing circuitry and/or executable program elements and change the text type information to the voice type information. The TTS module 960 may receive the text type information from the natural language generation module 950, and change the text format information to the voice format information. The electronic device 10 may output the changed voice type information using a speaker, or the like.

According to an embodiment, the NLU module 920, the path planner module 930, and the DM module 940 may be implemented as one module. For example, the NLU module 920, the path planner module 930, and the DM module 940 may be implemented as one module to determine the intention of the user and the parameter, and generate a reply (for example: path rule) corresponding to the determined user's intention and the parameter.

As such, the electronic device 10 or the server may implement the digital assistant using the above-described modules.

Figure 10:
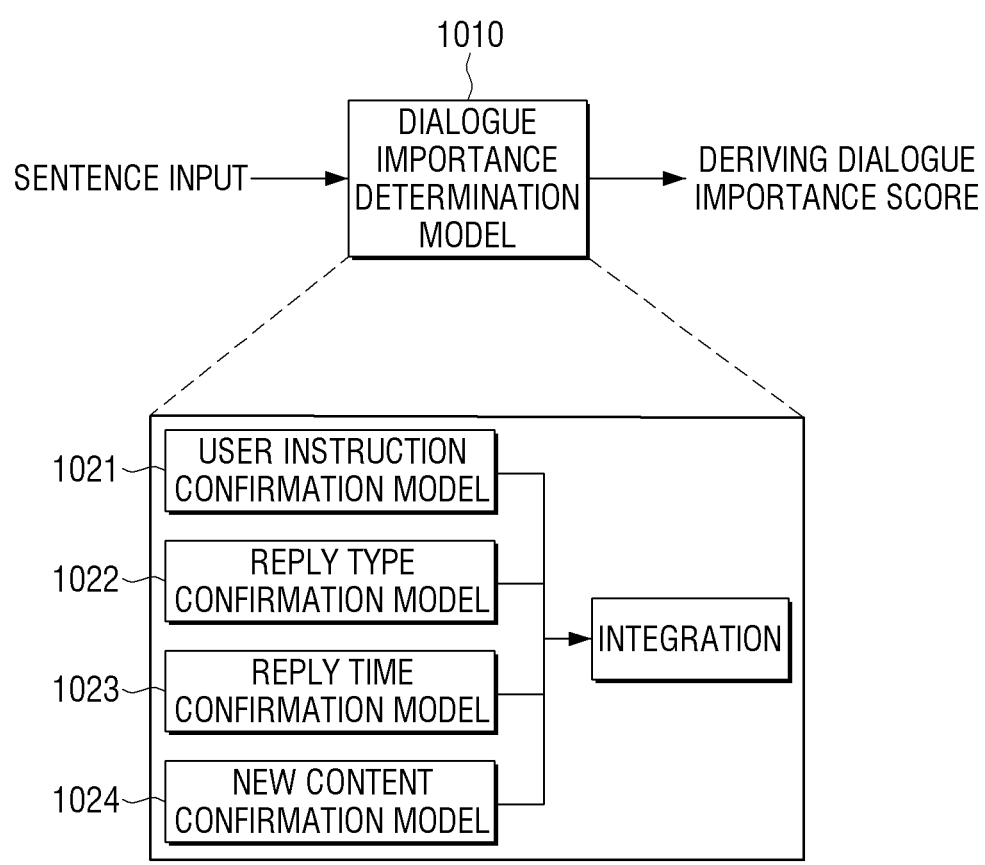
FIG. 10 is a diagram illustrating an example learning model used for determining level of importance to generate a notification of a user by a digital assistant according to an embodiment.

FIG. 10 is a diagram illustrating an example learning model may be used for determining level of importance to generate a notification of a user by a digital assistant.

According to an example embodiment, the NLU module (for example: the NLU module 920 of FIG. 9) may perform learning of at least one learning model. For example, the NLU module 920 may include a dialogue importance determination model (e.g., including processing circuitry and/or executable program elements) 1010. The dialogue importance determination model 1010 may include at least one of, for example, a user instruction confirmation model (e.g., including processing circuitry and/or executable program elements) 1021, a reply type confirmation model (e.g., including processing circuitry and/or executable program elements) 1022, a reply time confirmation model (e.g., including processing circuitry and/or executable program elements) 1023, and a new content confirmation model (e.g., including processing circuitry and/or executable program elements) 1024.

The user instruction confirmation model 1021, the reply type confirmation model 1022, the reply time confirmation model 1023, and the new content confirmation model 1024 included in the NLU module 920 may be established in consideration of an applicable field of the recognition model, a purpose of learning, and computer performance of an apparatus, or the like. The user instruction confirmation model 1021, the reply type confirmation model 1022, the reply time confirmation model 1023, and the new content confirmation model 1024 included in the NLU module 920 may be, for example, a model based on a neural network. The user instruction confirmation model 1021, the reply type confirmation model 1022, the reply time confirmation model 1023, and the new content confirmation model 1024 included in the NLU module 920 may be, for example, a neural network model or a deep learning model that is developed from a neural network model.

At least some of the NLU module 920 may be manufactured in the form of at least one hardware chip and mounted on the electronic device. For example, at least some of the NLU module 920 may be manufactured in the form of a dedicated hardware chip for AI, or may be manufactured as a part of a conventional general purpose processor (for example: a central processing unit (CPU) or application processor) or graphics only processor (for example: graphics processing unit (GPU)), and mounted on the aforementioned various electronic devices.

According to an embodiment, a dedicated hardware chip for AI may, for example, be a dedicated processor specialized in probability operation. Having a higher parallel processing performance than the general-use processor, the dedicated hardware chip for AI may rapidly process an operation of AI field such as machine learning.

At least a part of the NLU module 920 may be mounted in one apparatus, or respectively mounted in separate apparatuses. For example, at least some of the NLU module 920 may be included in the electronic device 10, and the rest may be included in the server. Alternatively, at least some of the NLU module 920 may be included in a first server, and one may be included in a second server that is different from the first server.

At least some of the NLU module 920 may be implemented as a software module. When at least some of the NLU module 920 is implemented as a software module (or a program module including instructions), the software module may be stored in a computer readable non-transitory readable recording medium. In this case, at least one software module may be provided by an operating system (OS) or by a predetermined application. Some of the at least one software module may be provided by an operating system (OS), and others may be provided by a predetermined application.

Figure 11:
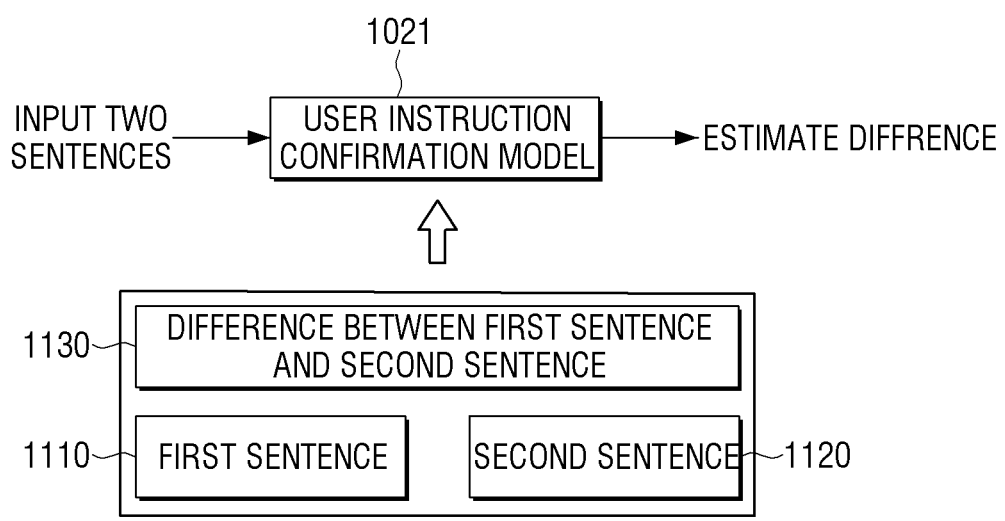
FIG. 11 is a diagram illustrating an example function of a user instruction confirmation model according to an embodiment.

FIG. 11 is a diagram illustrating an example function of a user instruction confirmation model according to an embodiment.

Referring to FIG. 11, the electronic device 10 may be trained to have a criterion to estimate whether the content included in the voice data or text data generated by the user of the electronic device 10 is consistent with content included in voice data or text data received from the another electronic device. The electronic device 10 may be trained to have a criteria regarding which learning data the user instruction confirmation model 1021 is to use to obtain a criterion for estimating whether the content included in the voice data or text data generated by the user or the content included in the voice data or text data received from the another electronic device, or how the consistency between the content included in the voice data or text data generated by the user using the learning data and the content included in the voice data or text data received from the another electronic device is estimated.

According to various embodiments, the electronic device 10 may train the user instruction confirmation model 1021 using a first sentence 1110, a second sentence 1120 different from the first sentence 1110, and information 1130 on a difference between the first sentence and the second sentence as learning data. The information 1130 on the difference between the first sentence and the second sentence may refer, for example, to a content that is included in the first sentence 1110 but not in the second sentence 1120, and a case where the content of the first sentence 1110 is opposite to the content of the second sentence 1120, or the like. For example, the learning data may be first sentence of "let's meet at a location A at 3 pm", a second sentence of "let's meet at a location B at 4 pm", and information on the difference between the first sentence and the second sentence such as 3 pm, 4 pm, place A, place B, or the like.

According to various embodiments, the electronic device 10 may estimate whether the content included in the voice data or text data that are generated by the user of the electronic device 10 is consistent with the content included in the voice data or text data received from another electronic device based on the learning result.

According to various embodiments, the electronic device 10 may use a user's reply (or feedback) regarding whether the voice data or text data generated by the user of the electronic device 10 is supposedly consistent with the voice data or text data received from the another electronic device to update the user instruction confirmation model 1021.

Figure 12:
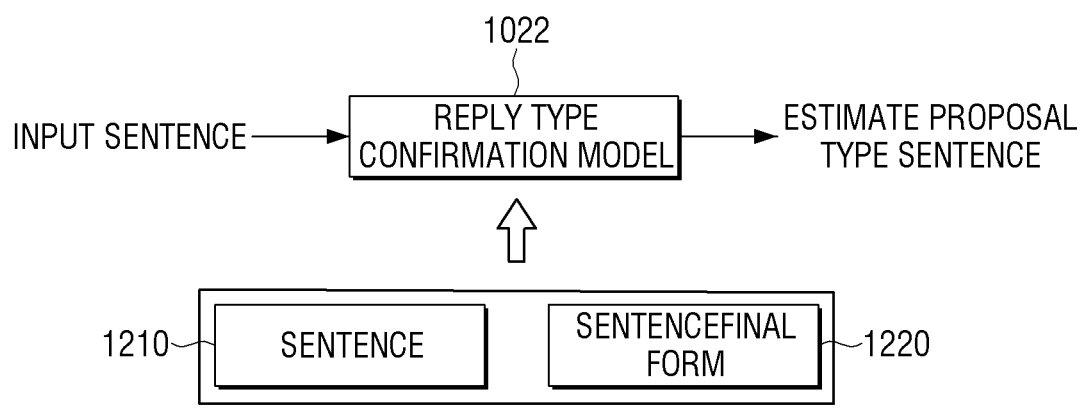
FIG. 12 is a diagram illustrating an example function of a reply type confirmation model according to an embodiment.

FIG. 12 is a diagram illustrating an example function of a reply type confirmation model according to an embodiment.

Referring to FIG. 12, the electronic device 10 may learn that the reply type confirmation model 1022 has a criterion for estimating whether an input sentence is a proposal type sentence requesting a specific decision from a user. The electronic device 10 may be trained to have a criterion regarding which learning data to use in order to acquire the criteria so that the reply type confirmation model 1022 estimates whether the input sentence is a proposal type sentence, or how to estimate whether the input sentence is a proposal type sentence using the learning data.

According to various embodiments, the electronic device 10 may train the reply type confirmation model 1022 using a sentence 1210 and a sentencefinal form 1220 of the proposal type sentence as the training data. The sentencefinal form 1220 of the proposal type sentence is, for example, "How about~?", "Shall we~?", "How do you think of ~?", "What do you think of~?", or the like.

According to various embodiments, the reply type confirmation model 1022 included in the electronic device 10 may estimate whether the voice data or text data received from the another electronic device is a proposal type sentence based on the learning result. The reply type confirmation model 1022 may derive the estimation result as a score, for example.

According to various embodiments, the electronic device 10 may use the user's reply regarding the estimation result regarding whether the voice data or sentence data received from the another electronic device is a proposal type sentence to update the reply type confirmation model 1022.

Figure 13:
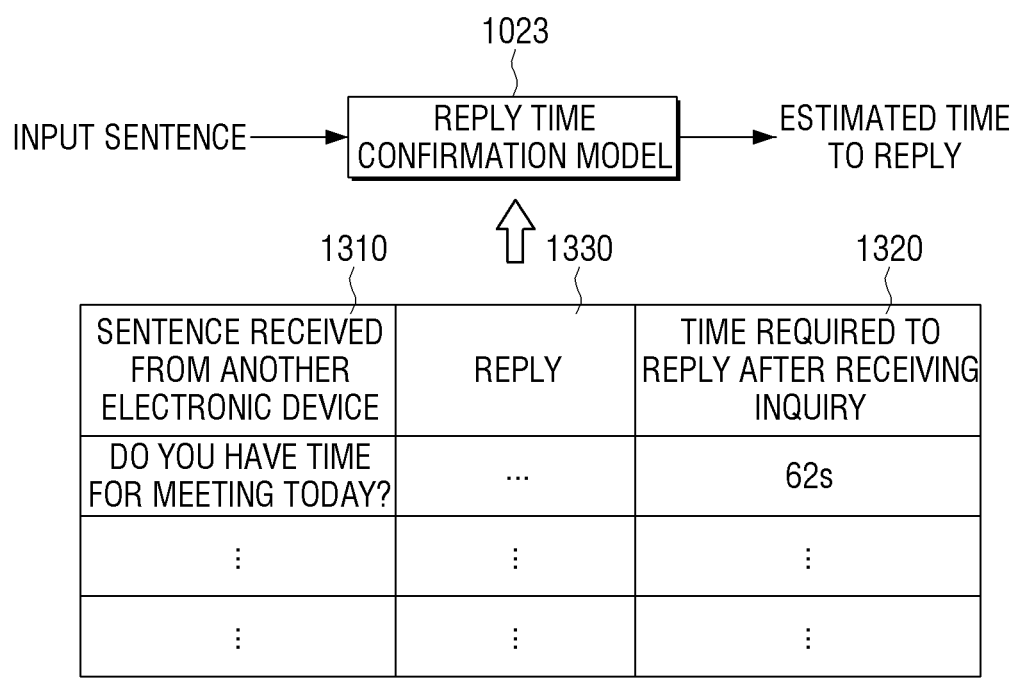
FIG. 13 is a diagram illustrating an example function of a reply time confirmation model according to an embodiment.

FIG. 13 is a diagram illustrating an example function of a reply time confirmation model according to an embodiment.

Referring to FIG. 13, the electronic device 10 may be trained so that the reply time confirmation model 1023 has a criterion for estimating a time required for the user to reply to an input sentence. The electronic device 10 may be trained to have a criterion regarding what learning data the reply time confirmation model 1023 to use to obtain the criterion for estimating time required till the user replies for the input sentence, and how to estimate the time required until the user replies regarding the input sentence using the learning data.

According to various embodiments, the electronic device 10 may train the reply time confirmation model 1023 using the sentence 1310 received from another electronic device as learning data and a time 1320 required to reply to the received sentence. According to various embodiments, the electronic device 10 may use the sentence 1330 answered by the user as the training data in response to the sentence 1310 received from another electronic device as the training data.

According to various embodiments, the reply time confirmation model 1023 included in the electronic device 10 may estimate the time which is expected to be required until the user responds regarding the voice data or text data received from the another electronic device based on a learning result. The reply time confirmation model 1023 may derive the estimation result as a score, for example.

According to various embodiments, the electronic device 10 may use the user's reply regarding the result of estimating the estimated time required until the user answers regarding the voice data or text data received from the another electronic device to update the reply time confirmation model 1023.

Figure 14:
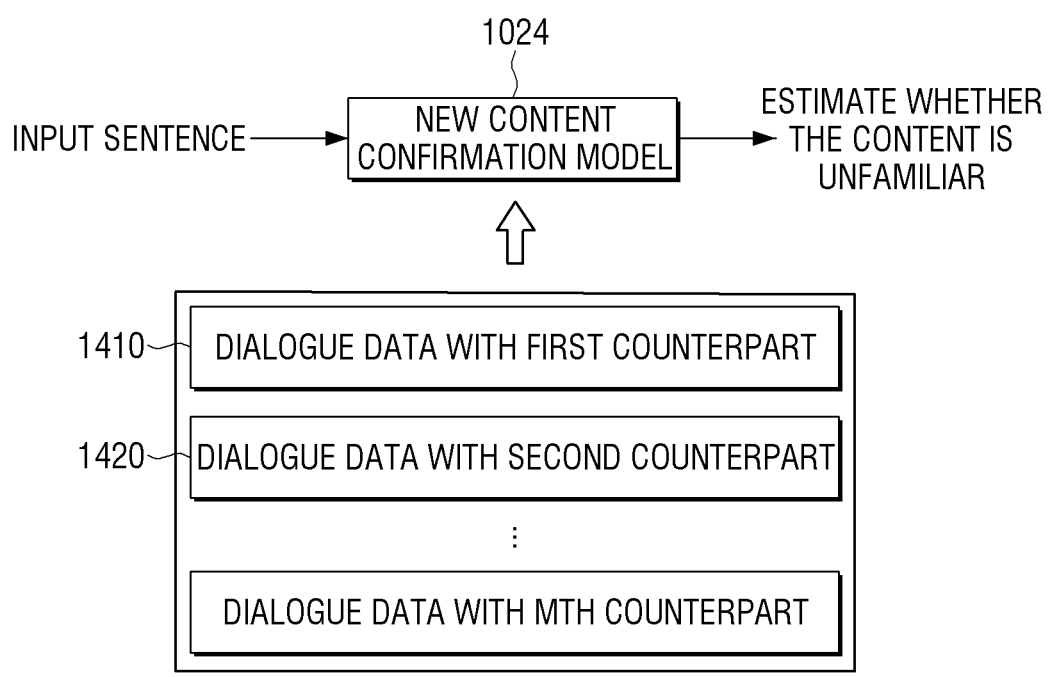
FIG. 14 is a diagram illustrating an example function of a reply time confirmation model according to an embodiment.

FIG. 14 is a diagram illustrating an example function of a reply time confirmation model according to an embodiment.

Referring to FIG. 14, the electronic device 10 may learn so that the new content confirmation model 1024 has a criterion for estimating whether a content of an input sentence is unfamiliar in a dialogue with a counterpart. The electronic device 10 may be trained so that the new content confirmation model 1024 obtains a criterion for estimating whether the content of the input sentence is unfamiliar content in the dialogue with the counterpart and how to estimate whether the content of the input sentence is unfamiliar content in the dialogue with the counterpart using the learning data.

According to various embodiments, the electronic device 10 may train the new content confirmation model 1024 using dialogue data 1410 with a first counterpart, dialogue data 1420 with a second counterpart, or the like, as the learning data.

According to various embodiments, the new content confirmation model 1024 included in the electronic device 10 may estimate whether the content included in the voice data or text data received from the another electronic device is an unfamiliar content in a relation with the counterpart, based on the learning result.

According to various embodiments, the electronic device 10 may use the user's reply to the result of estimating whether the content included in the voice data or text data received from the another electronic device is an unfamiliar content in the relation with the counterpart to update the new content confirmation model 1024.

Figure 15:
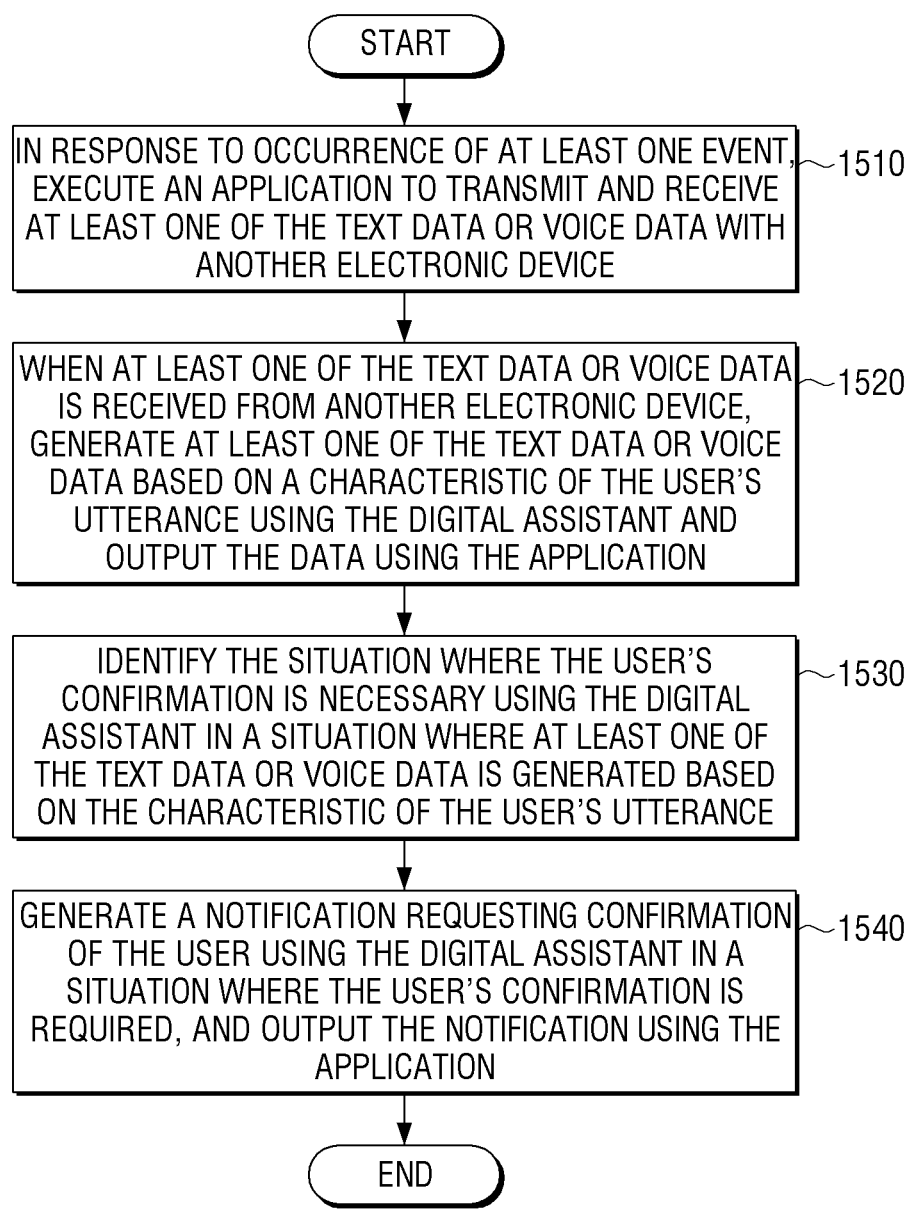
FIG. 15 is a flowchart illustrating an example operation of transmitting and receiving text data or voice data with a third party by an electronic device using a digital assistant according to an embodiment.

FIG. 15 is a flowchart illustrating an example of transmitting and receiving text data or voice data with a third party by an electronic device using a digital assistant according to an embodiment.

Referring to operation 1510, the electronic device 10 may execute an application to transmit and receive at least one of the text data or voice data with the another electronic device, in response to occurrence of at least one event.

The at least one event may refer, for example, to a case where an input from a user is received to execute an application for transmitting and receiving at least one of text data or voice data with another electronic device. Alternatively, at least one event may refer, for example, to a case of receiving text data or voice data from another electronic device.

Referring to operation 1520, when at least one of the text data or voice data is received from the another electronic device, the electronic device 10 may generate at least one of the text data or voice data based on a characteristic of the user's utterance using the digital assistant, and output the data using the application.

For example, the electronic device 10 may acquire the characteristic of the user's utterance using at least one of the call log, text input history of the user, and generate the text data reflecting the characteristic of the user's utterance using the acquired characteristic of the user's utterance.

Referring to operation 1530, the electronic device 10 may identify the situation where the user's confirmation is necessary using the digital assistant in a situation where at least one of the text data or voice data is generated based on the characteristic of the user's utterance.

The case where confirmation of the user is required, for example, may be the case that user instruction confirmation is required. That is, some contents included in the text data or the voice data generated by the user and some contents of the text data or the voice data received from another electronic device may not be consistent.

The case where the user's confirmation is necessary may be, for example, the case where the text data or voice data which the digital assistant should generate needs to determine whether to accept the proposal. That is, when a proposal is included in the text data or voice data received from another electronic device, a prudential reply may be required, and the electronic device 10 may identify this case as requiring the user's confirmation.

The case where the user's confirmation is required may be, for example, the case where the time of the user for responding to the utterance needs to be confirmed. In other words, if the user's time to respond to the counterpart's voice is longer than the preset time (for example, the user's average answer possession time), it may be a situation that prudent reply is necessary. Thus, the electronic device 10 may identify this case as requiring the user's confirmation.

The case where the user's confirmation is necessary may be, for example, the similarity between the text data or voice data received from the another electronic device and the text data or voice data prestored in the electronic device is less than or equal to a predetermined value. The electronic device 10 may be in the case where the prudential reply is necessary, the electronic device 10 may identify this case as requiring the user's confirmation.

Referring to operation 1540, the electronic device 10 may generate a notification requesting confirmation of the user using the digital assistant in a situation where the user's confirmation is required, and output the notification using the application.

Figure 16:
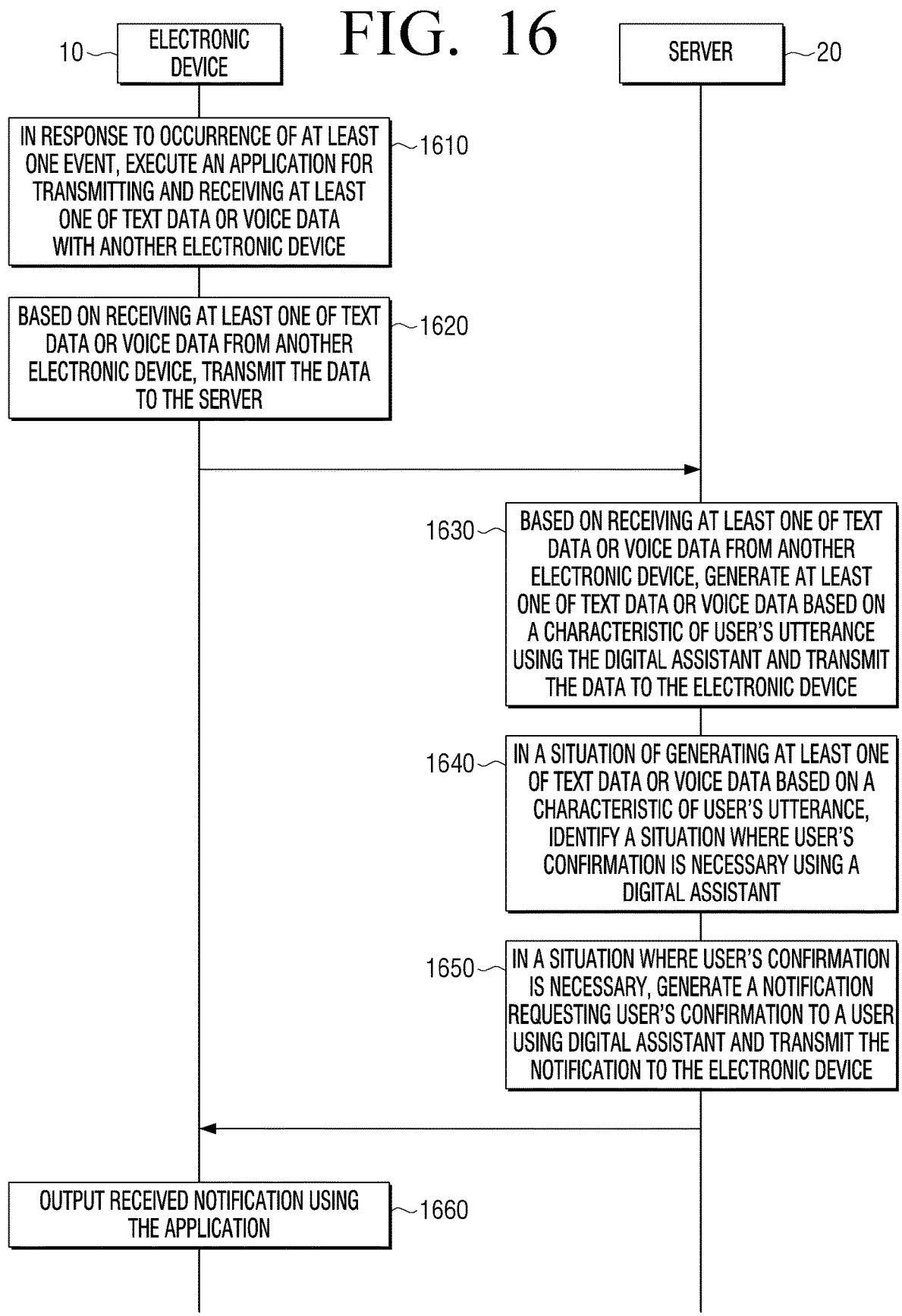
FIG. 16 is a flowchart illustrating an example operation of transmitting and receiving text data or voice data with a third party using a digital assistant by an electronic device and a server according to an embodiment.

FIG. 16 is a flowchart illustrating an example of transmitting and receiving text data or voice data with a third party using a digital assistant by an electronic device and a server according to an embodiment.

Referring to operation 1610, the electronic device 10 may execute an application to transmit or receive at least one of the text data or voice data with the another electronic device, in response to occurrence of at least one event.

Referring to operation 1620, upon receiving at least one of the text data or voice data from the another electronic device, the electronic device 10 may transmit the data to the server 20.

Referring to operation 1630, upon receiving at least one of the text data or voice data from the electronic device 10, the server 20 may generate at least one of the text data or voice data based on a characteristic of the user's utterance and transmit the data to the electronic device 10.

Referring to operation 1640, the server 20 may identify a situation where the user's confirmation is necessary using the digital assistant, in a situation where at least one of the text data or voice data is generated based on a characteristic of the user's utterance.

Referring to operation 1650, the server 20 may generate a notification to request confirmation of the user using the digital assistant in a situation where the user's confirmation is necessary, and transmit the notification to the electronic device 10.

Referring to operation 1660, the electronic device 10 may output the received notification using the application.

Figure 17:
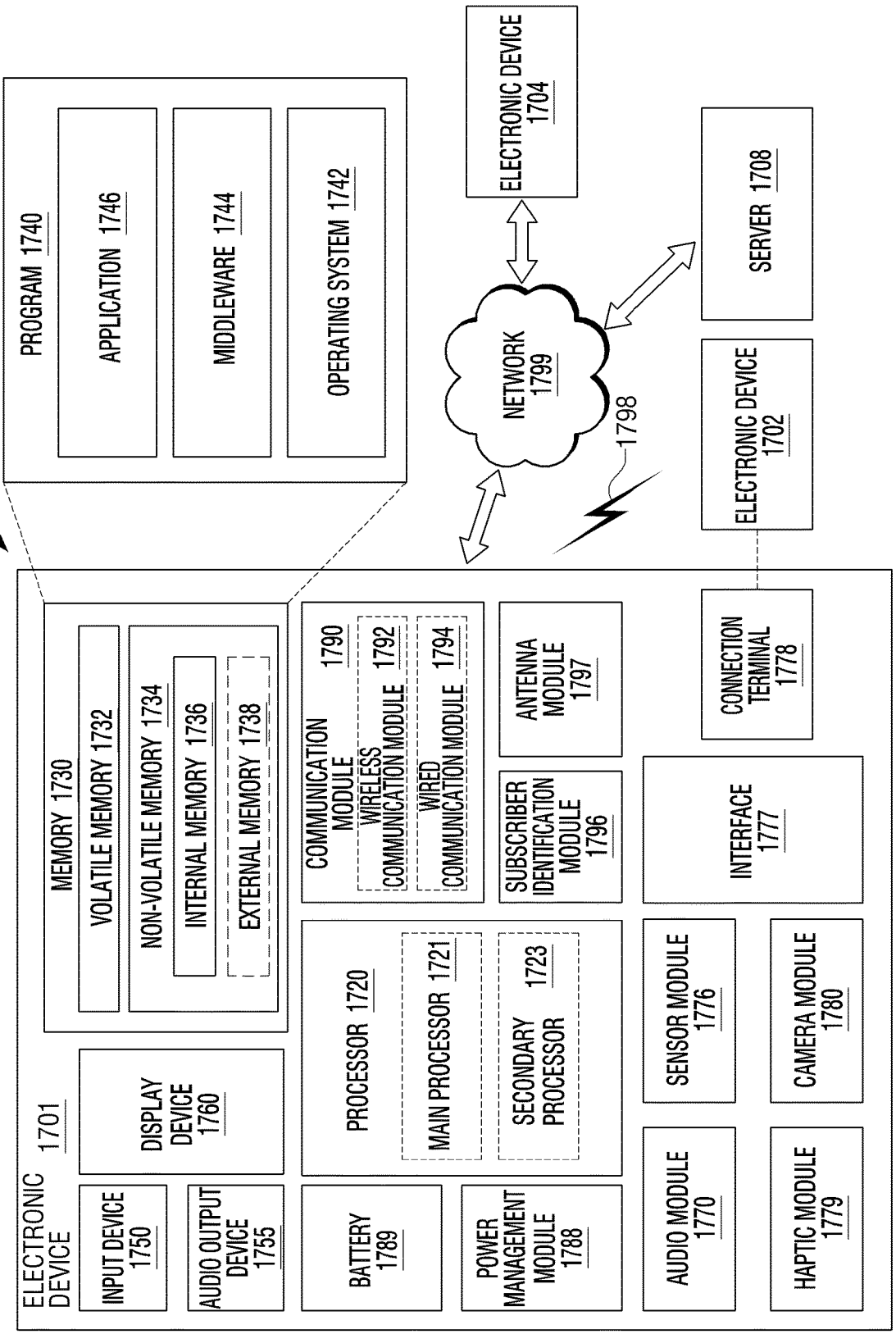
FIG. 17 is a block diagram illustrating an example electronic device in a network environment according to various embodiments.

FIG. 17 is a block diagram of an electronic device 1701 in a network environment 1700 according to various embodiments. An electronic device 1701 may include the electronic device 10 of FIG. 1. Referring to FIG. 17, in the network environment 1700, the electronic device 1701 may communicate with an electronic device 1702 via a first network 1798 (e.g., a short-range wireless communication network) or communicate with an electronic device 1704 or a server 1708 via a second network 1799 (e.g., wide area network). According to an example embodiment, the electronic device 1701 may communicate with the electronic device 1704 via the server 1708. According to an example embodiment, the electronic device 1701 may include a processor 1720, a memory 1730, an input device 1750, an audio output device 1755, a display device 1760, an audio module 1770, a sensor module 1776, an interface 1777, a haptic module 1779, a camera module 1780, a power management module 1788, a battery 1789, a communication module 1790 (e.g., a transceiver), a subscriber identification module 1796, or an antenna module 1797. In some embodiments, at least one (e.g., display device 1760 or camera module 1780) of these components may be omitted from electronic device 1701, or one or more other components may be added. In some embodiments, some of these components may be implemented as a single integrated circuit. For example, the sensor module 1776 (e.g., a fingerprint sensor, an iris sensor, or an illumination sensor) may be implemented to be embedded in the display device 1760 (e.g., a display).

The processor 1720 may control the at least one another component (e.g., hardware or software component) of the electronic device 1701 connected to the processor 1720 by executing the software (e.g., the program 1740) and perform various data processing or operation. According to an embodiment, as at least a part of the data processing or operation, the processor 1720 may load the command or data received from another component (e.g., the sensor module 1776 or the communication module 1790) to a volatile memory 1732, process command or data stored in the volatile memory 1732, and store the result data in a non-volatile memory 1734. According to an example embodiment, the processor 1720 may include a main processor 1721 (e.g., a central processing unit or an application processor), and a secondary processor 1723 (e.g., a graphics processing unit, an image signal processor, a sensor hub processor, or a communication processor) which may be operated together or independently. Additionally or alternatively, the secondary processor 1723 may use less power than the main processor 1721, or may be set to be specialized to a designated function. The secondary processor 1723 may be implemented separately from, or as a part of, the main processor 1721.

The secondary processor 1723 may, for example, in place of the main processor 1721 while the main processor 1721 is in an inactive state (for example: sleep) or along with the main processor 1721 while the main processor 1721 is in an active state (for example: execution of an application) control a part of the functions or states related to at least one component (for example: display device 1760, the sensor module 1776, or the communication module 1790) among the components of the electronic device 1701. According to an example embodiment, the secondary processor 1723 (e.g., an image signal processor or a communication processor) may be implemented as a part of a functionally related other components (e.g., camera module 1780 or communication module 1790).

The memory 1730 may store various data used by at least one component (e.g., processor 1720 or sensor module 1776) of the electronic device 1701. The data may include, for example, software (e.g., program 1740) and input data or output data related with software instructions. The memory 1730 may include the volatile memory 1732 or non-volatile memory 1734.

The program 1740 may be stored in the memory 1730 as software, and include, for example, an operating system 1742, middleware 1744, or an application 1746.

The input device 1750 may receive a command or data to be used for the components (e.g., processor 1720) of the electronic device 1701 from the outside (e.g., user) of the electronic device 1701. The input device 1750 may include, for example, a microphone, a mouse, or a keyboard.

The sound output device 1755 may output a sound signal to the outside of the electronic device 1701. The sound output device 1755 may include, for example, a speaker or a receiver. The speaker may be used for general purposes, such as multimedia playback or recording playback, and the receiver may be used to receive incoming calls. According to an example embodiment, the receiver may be implemented separately from, or as a part of, the speaker.

The display device 1760 may visually provide information to an outside (e.g., user) of the electronic device 1701. The display device 1760 may include, for example, a display, a hologram device, a projector, or a control circuit for controlling the device. According to an embodiment, the display device 1760 may include a touch circuitry which is set to detect a touch or a sensor circuit (e.g., a pressure sensor) which is set to measure intensity of power generated by the touch.

The audio module 1770 may convert sound into an electric signal, or convert an electric signal to sound. According to an example embodiment, the audio module 1770 may acquire sound through an input device 1750, or output sound through the sound output device 1755, or an external electronic device (e.g., electronic device 1702) (e.g., speaker or headphone) which is directly or wirelessly connected to the electronic device 1701.

The sensor module 1776 may detect the operation state of the electronic device 1701 (e.g., power or temperature), or an external environment state (e.g., a user state), and generate an electrical signal or a data value corresponding to the detected state. According to an embodiment, the sensor module 1776 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1777 may support one or more designated protocols that may be used by the electronic device 1701 to be connected directly or wirelessly to an external electronic device (e.g., electronic device 1702). According to an embodiment, the interface 1777 may include, for example, a high definition multimedia interface (HDMI), a universal serial bus (USB) interface, a secure digital (SD) card interface, or an audio interface.

A connection terminal 1778 may include a connector through which the electronic device 1701 may be physically connected to an external electronic device (e.g., the electronic device 1702). According to an embodiment, the connection terminal 1778 may include, for example, an HDMI connector, a USB connector, an SD card connector, or an audio connector (e.g., a headphone connector).

The haptic module 1779 may convert an electrical signal into a mechanical stimulus (e.g., vibration or motion) or an electrical stimulus that a user may recognize through a tactile or kinesthetic sense. According to an embodiment, the haptic module 1779 may include, for example, a motor, a piezoelectric element, or an electric stimulation device.

The camera module 1780 may photograph a still image or a moving image. According to an embodiment, the camera module 1780 may include one or more lenses, image sensors, image signal processors, or flashes.

The power management module 1788 may manage power supplied to the electronic device 1701. According to an embodiment, the power management module 1788 may be implemented as, for example, at least a part of power management integrated circuit (PMIC).

The battery 1789 may supply power to at least one component of the electronic device 1701. According to an embodiment, the battery 1789 may include, for example, a non-rechargeable primary battery, a rechargeable secondary battery, or a fuel cell.

The communication module 1790 may support establishment of direct (e.g.: wired) communication channel between the electronic device 1701 and an external electronic device (e.g., electronic device 1702, electronic device 1704, or server 1708) or wireless communication channel, and communication through the established communication channels. The communication module 1790 may include one or more communication processors which are operated independently of the processor 1720 (e.g., application processor) and support direct (e.g., wired) communication or wireless communication. According to an embodiment, the communication module 1790 may include a wireless communication module 1792 (e.g., cellular communication module, near field wireless communication module, or global navigation satellite system (GNSS) communication module) or wired communication module 1794 (e.g., local area network (LAN) communication module, or power line communication module). The corresponding communication module among these communication modules may communicate with an external electronic device via the first network 1798 (e.g., Bluetooth, WiFi direct or near field communication network such as infrared data association (IrDA)) or the second network 1799 (e.g., telecommunication network such as cellular network, Internet, or computer network (e.g., LAN or WAN)). These types of communication modules may be incorporated into one component (e.g., a single chip) or implemented with a plurality of components (e.g., a plurality of chips) that are separate from each other. The wireless communication module 1792 may confirm and authenticate the electronic device 1701 in the communication network such as the first network 1798 or the second network 1799 using the subscriber information (e.g., international mobile subscriber identity (IMSI)) stored in the subscriber identification module 1796.

The antenna module 1797 may transmit a signal or power to an external device (e.g., an external electronic device) or receive a signal or power from the outside. According to an example embodiment, the antenna module 1797 may include one or more antennas from which at least one antenna suitable for a communication method used in a communication network, such as the first network 1798 or the second network 1799, may be selected by, for example, the communication module 1790. A signal or power may be transmitted or received between the communication module 1790 and the external electronic device via the selected at least one antenna.

At least a part of the components may be interconnected through the communication method (e.g., bus, general purpose input and output (GPIO), serial peripheral interface (SPI), or mobile industry processor interface (MIPI)) among peripheral devices and exchange a signal (e.g., command or data) from each other.

According to an example embodiment, the command or data may be transmitted or received between the electronic device 1701 and the external electronic device 1704 via the server 1708 connected to the second network 1799. Each of the electronic devices 1702 and 1704 may be devices which are the same or different types from the electronic device 1701. For example, when the electronic device 1701 is a personal electronic device for an individual such as smartphone, external electronic devices 1702 and 1704 may be a mobile robot TV or a fixed-type common use electronic device for a plurality of people such as or a refrigerator. According to an embodiment, whole or a part of the operations executed by the electronic device 1701 may be executed by one or more external devices among the external electronic devices 1702, 1704, or 1708. For example, when the electronic device 1701 has to perform a function or service automatically, or in response to a request from a user or another device, the electronic device 1701 may request one or more external electronic devices to perform at least a part of the function or the service instead of, or in addition to, performing the function or service by itself. The one or more external electronic devices that have received the request may execute at least a portion of the requested function or service, or an additional function or service associated with the request, and transmit the result of the execution to the electronic device 1701. The electronic device 1701 may process the result as is or additionally, and provide the result as at least a portion of the response to the request. For this purpose, for example, cloud computing, distributed computing, or client-server computing technology may be used.

For example, when the electronic device 1701 receives the user voice and transmits the voice to external electronic devices 1702 and 1704, the external electronic devices 1702 and 1704 may execute a function corresponding to the user's voice by analyzing the received voice and generating the path rule.

The various embodiments of the disclosure may be implemented with software (e.g., program 1740) including one or more instructions stored in the storage medium (e.g., internal memory 1736 or external memory 1738) readable by a machine (e.g., electronic device 1701). For example, the processor (e.g., processor 1720) of a device (e.g., electronic device 1701) may call at least one instruction among one or more instructions stored in the storage medium and execute the instructions. This enables a device to be operated to perform at least one function according to the called at least one instructions. The instructions may include a code generated by a compiler or a code executable by an interpreter. The storage medium readable by a machine may be provided in the form of a non-transitory storage medium that is a tangible device and may not include a signal (e.g., electromagnetic wave). This term does not distinguish that data is permanently or temporarily stored in the storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or at least one other operations may be added.

While various example embodiments of the disclosure have been illustrated and described herein, it will be understood that the various example embodiments are intended to be illustrative, not limiting. One of ordinary skill in the art will understand that various changes in form and details may be made without departing from the true spirit and full scope of the disclosure as set forth, for example, in the appended claims and their equivalents.

What is claimed is:

1. An electronic device comprising:
a communication module comprising communication circuitry;
a processor; and
a memory storing at least one command which, when executed by the processor, is/are configured to control the electronic device to:
in response to occurrence of at least one event, execute an application configured to transmit and receive at least one of text data or voice data with another electronic device using the communication module,
receive text data or voice data from the another electronic device,
identify similarity of at least some content of the text data or voice data received from another electronic device and text data or voice data prestored in the electronic device is less than or equal to a predetermined value,
identify, using a digital assistant, whether a user's confirmation is necessary for a response based on the identification that the similarity of at least some content of the text data or voice data received from another electronic device and text data or voice data prestored in the electronic device being less than or equal to the predetermined value, the response to be generated based on a characteristic of the user's utterance,
based on identification that the user's confirmation is necessary, provide a notification including an object to approve content of the received text data or voice data; and
based on identification that the user's confirmation is unnecessary, transmit to the another electronic device the response to the another electronic device without providing the notification.

2. The electronic device of claim 1, wherein the notification to request the confirmation comprises text data or voice data based on text data or voice data received from the another electronic device.

3. The electronic device of claim 2, wherein the electronic device further comprises a display, and
wherein the at least one command, when executed by the processor, controls the electronic device to:
display at least one of an object to approve content of text data included in the notification to request the confirmation, an object to reject, and an object to receive a direct input.

4. The electronic device of claim 1, wherein the at least one command, when executed by the processor, controls the electronic device to:
identify that the confirmation is required based on at least some content of text data or voice data received from the another electronic device not being consistent with at least some content of input text data or voice data.

5. The electronic device of claim 1, wherein the at least one command, when executed by the processor, controls the electronic device to:
identify that the confirmation is required based on a proposal included in text data or voice data received from the another electronic device.

6. The electronic device of claim 1, wherein the at least one command, when executed by the processor, controls the electronic device to:
identify that the confirmation is required based on a time that is required for responding to text data or voice data that are same or similar to the text data or voice data received from the another electronic device is greater than or equal to a predetermined time.

7. The electronic device of claim 1, wherein the at least one command, when executed by the processor, controls the electronic device to:
identify that the confirmation is required based on a similarity between at least some of content included in text data or voice data received from the another electronic device and text data or voice data pre stored in the electronic device being less than or equal to a predetermined value.

8. The electronic device of claim 1, wherein the at least one command, when executed by the processor, controls the electronic device to:
transmit, to the another electronic device, sound data or an indicator to provide a notification that the digital assistant generates at least one of the text data or voice data based on a characteristic of the utterance and that the text data or voice data is generated by the digital assistant based on outputting the data using the application.

9. The electronic device of claim 1, wherein the at least one command, when executed by the processor, controls the electronic device to:
generate summary text data or summary voice data using at least a portion of the text data or voice data received from the another electronic device or the text data or voice data generated by the digital assistant, and
output the data using the application.

10. A server comprising:
a data acquisition unit comprising data acquisition circuitry configured to acquire text data or voice data from an external electronic device;
a data processor configured to:
identify whether a user's confirmation is required for a response based on an identification that similarity of at least some content of the text data or voice data received from another electronic device and text data or voice data prestored in the external electronic device being less than or equal to a predetermined value, wherein the response is to be generated based on a characteristic of the user's utterance, provide a notification to request the user's confirmation based on the user's confirmation being required; and a data outputter, comprising data output circuitry, configured to transmit a notification requesting the user's confirmation to the external electronic device, wherein the notification includes an object to approve content of the acquired text data or voice data.

11. A method of controlling an electronic device, the method comprising:

in response to occurrence of at least one event, executing an application for transmitting and receiving at least one of text data or voice data with another electronic device;

receiving text data or voice data from the another electronic device;

identifying that similarity of at least some content of the text data or voice data received from another electronic device and text data or voice data prestored in the electronic device is less than or equal to a predetermined value identifying, using a digital assistant, whether a user's confirmation is necessary for a response based on the identification that the similarity of at least some content of the text data or voice data received from another electronic device and text data or voice data prestored in the electronic device being less than or equal to a predetermined value, wherein the response being generated based on a characteristic of the user's utterance, based on the identification that the user's confirmation being necessary, providing a notification including an object to approve content of the received text data or voice data; and based on the identification that the user's confirmation being unnecessary, transmitting the response to the another electronic device without providing the notification.

12. The method of claim 11, wherein the notification to request confirmation comprises text data or voice data based on text data or voice data received from the another electronic device.

13. The method of claim 12, further comprising:
displaying at least one of an object to approve content of text data included in the notification to request the confirmation, an object to reject, and an object to receive a direct input based on confirmation being necessary.

14. The method of claim 11, further comprising: identifying that the confirmation is required based on at least some content of text data or voice data received from the another electronic device not being consistent with at least some content of text data or voice data that are input.

15. The method of claim 11, further comprising: identifying that the confirmation is required based on a proposal being included in text data or voice data received from the another electronic device.

16. The method of claim 11, further comprising: identifying that the confirmation is required based on a time required for a user to respond to text data or voice data that are same or similar to the text data or voice data received from the another electronic device being greater than or equal to a predetermined time.

17. The method of claim 11, further comprising: identifying that the confirmation is required based on a similarity between at least some of content included in text data or voice data received from the another electronic device and text data or voice data prestored in the electronic device being less than or equal to a predetermined value.

18. The method of claim 11, further comprising: generating at least one of the text data or voice data by the digital assistant based on a characteristic of the utterance and transmitting, to the another electronic device, sound data or an indicator to provide a notification that the text data or voice data is generated by the digital assistant.

19. The method of claim 11, further comprising: generating summary text data or summary voice data using at least a portion of the text data or voice data received from the another electronic device or the text data or voice data generated by the digital assistant, and outputting the data using the application.

* * * * *